United States Patent [19]

Abe et al.

[11] Patent Number: 5,295,415
[45] Date of Patent: Mar. 22, 1994

[54] TORQUE CONTROL APPARATUS FOR ENGINE AND AUTOMATIC TRANSMISSION

[75] Inventors: Mitsutoshi Abe; Kazuo Sasaki; Hiroshi Yoshimura; Masahito Kitada; Kanji Okamoto; Toshihisa Marusue, all of Hiroshima, Japan

[73] Assignee: Mazda Motor Corporation, Hiroshima, Japan

[21] Appl. No.: 859,569

[22] Filed: Mar. 27, 1992

[30] Foreign Application Priority Data

Mar. 29, 1991 [JP] Japan .................. 3-065872
Jun. 26, 1991 [JP] Japan .................. 3-154485
Jun. 26, 1991 [JP] Japan .................. 3-154491

[51] Int. Cl.$^5$ .............................. B60K 41/08
[52] U.S. Cl. ........................... 74/859; 74/851; 74/872
[58] Field of Search ................. 74/851, 859, 872

[56] References Cited

U.S. PATENT DOCUMENTS

| | | | |
|---|---|---|---|
| 4,226,141 | 10/1980 | Espenschied | 74/859 X |
| 4,266,447 | 5/1981 | Heess et al. | 74/858 |
| 4,355,550 | 10/1982 | Will et al. | 74/872 |
| 4,370,903 | 2/1983 | Stroh et al. | 74/858 |
| 4,370,904 | 2/1983 | Müller et al. | 74/858 |
| 4,403,527 | 9/1983 | Mohl et al. | 74/851 |
| 4,800,781 | 1/1989 | Yasue et al. | 74/851 |
| 5,012,695 | 5/1991 | Kyohzuka et al. | 74/859 |
| 5,072,630 | 12/1991 | Kikuchi et al. | 74/851 X |

FOREIGN PATENT DOCUMENTS

| | | |
|---|---|---|
| 56-35857 | 4/1981 | Japan . |
| 60-227049 | 11/1985 | Japan . |
| 63-71533 | 3/1988 | Japan . |
| 2-20817 | 5/1990 | Japan . |
| 2-62695 | 12/1990 | Japan . |

*Primary Examiner*—Leslie A. Braun
*Assistant Examiner*—Ryan W. Massey
*Attorney, Agent, or Firm*—Keck, Mahin & Cate

[57] ABSTRACT

A control apparatus for an engine and an automatic transmission controls a starting timing, a terminating timing, or methods of torque reduction of the engine during gear shifts. Using stored information such as a turbine speed signal, a gear shift signal, a degree to which a throttle valve is opened, a vehicle speed, an engine speed and so on, the control apparatus calculates an appropriate torque reduction which is performed by either retarding ignition timing or cutting fuel supplied to fuel injection valves. According to one embodiment of the invention, by detecting a variation ratio or differential value of turbine speed, a period of the torque reduction is started, ended, and kept within a proper timing. According to another embodiment of the invention, based on a "chasing" state of an input torque of the transmission against the variation of engine load, the timing of torque reduction is changed. Finally, according to yet another embodiment of the invention, a light preceding torque reduction is performed prior to a more significant torque reduction, but only when shocks due to the gear shift tend to occur.

5 Claims, 28 Drawing Sheets

TORQUE CONTROL APPARATUS FOR ENGINE AND AUTOMATIC TRANSMISSION

BACKGROUND OF THE INVENTION

1. Field of the Invention

This invention relates to a torque control apparatus for an engine and an automatic transmission and, more particularly, to a control apparatus in which shocks produced during a gear shift are moderated by a torque reduction control for the output of the engine during the gear shift.

Generally, an automatic transmission for an automotive vehicle is equipped with a torque converter and a transmission gear mechanism. The torque converter transmits torque from an output shaft of the engine to a turbine shaft by changing its speed of rotation. The transmission gear mechanism transmits the torque of the turbine shaft to driving wheels after further changing the rotational speed and, when the automotive vehicle is propelled backward, by reversing the rotational direction.

The transmission gear mechanism ordinarily includes a planetary gear system having gears, a plurality of clutches for locking or unlocking a turbine shaft and predetermined gears, and a plurality of brakes for fixing or releasing predetermined gears. In the transmission gear mechanism, turn-on and turn-off patterns for the clutches and brakes are changed by a hydraulic mechanism, so that a power transmission route in the planetary gear system is switched. It is, therefore, possible to provide gear shifts and to switch between forward and backward driving.

2. Description of Related Art

During a gear shift in such an automatic transmission, such as a downshift from third gear to second gear, a 2-4 brake, for example, is turned on or engaged, and a 3-4 clutch and coast clutch, for example, are turned off or disengaged. However, since the amount of torque transmission abruptly changes midway through such a gear shift, shocks due to gear shifts can occur and be a problem.

To prevent the occurrence of such shocks during a gear shift, torque control means or apparatuses, by which the output torque of the engine is temporarily reduced during the shift, are ordinarily provided in automatic transmissions. More specifically, in an automatic transmission, for example, after detecting a start time of a gear shift operation on the basis of a variation ratio of an input speed of the automatic transmission, the torque of the engine is reduced only during a predetermined period from the start time to a time counted up by a timer, as described in Japanese Unexamined Patent Publication No. 60-248,445.

However, in such a known automatic transmission, time required for gear shifts and timings or periods in which shocks tend to occur during the gear shifts have not been set so that torque is reduced. This causes problems in that an increasing speed of the engine and, therefore, vehicle acceleration may deteriorate due to overreduction of torque after an end of a gear shift. Also, shocks produced during gear shifting may occur due to an early release of torque reduction.

Similarly, as is clear from Japanese Unexamined Patent Publication No. 60-227,049, a known control apparatus performs a reduction control of the output of the engine between starting and terminating speeds. Such a reduction control is performed by detecting the engine speed, determining the starting speed of the reduction control at a time at which the variation ratio of the engine speed is equal to or larger than a predetermined value during an upshift of the automatic transmission, and predicting the terminating speed of the reduction control of the output torque, from a memorized table of data, on the basis of the starting speed in accordance with the degree to which the throttle valve is open, vehicle speed, and the kinds of gear shift, such as a shift from the 1-speed gear to the 2-speed gear.

In such a control apparatus, since the reduction control of the output torque is started from the time at which the variation ratio of the engine speed becomes equal to or larger than the predetermined value, the reduction control is carried out during the gear shift surely and without a malfunction.

However, when the variation ratio of the engine speed becomes equal to or larger than the predetermined value, which may occur for example, when the engine speed becomes equal to or larger than the predetermined value in a short or relatively long time, the engine variation conditions may be different, even if other conditions right before the gear shift, for example, the vehicle speed, are the same. Consequently, although the speeds at which the reduction control of the output torque should be terminated differ according to differences in these conditions, since the terminating speed is determined as a unitary value memorized in the table, termination of the reduction control of the output torque can not be performed precisely. As a result, if the reduction control of the output of the engine is terminated early, shocks from the gear shift are not effectively moderated. Also, if the reduction control is continued more than necessary, deterioration of acceleration performance of the vehicle becomes a problem.

In particular, during a gear shift which involves a 3-4 clutch having a drift on ball, for example, during a downshift from third gear to second gear, the operational characteristics of the drift on ball is varied in response to a driving condition. Consequently, a period required for the gear shift varies, and disadvantages such as those mentioned above arise.

Shocks due to a gear shift are generally determined according to a torque input into the transmission from the engine, i.e., an input torque of the transmission. Therefore, it is desirable to change torque reduction characteristics in accordance with the input torque, for instance, to change a timing for reducing the torque. Another previously known torque control apparatus shifts the timing for reducing the torque in response to the engine speed, which relates to the output torque thereof. Such an apparatus is described in Japanese Patent Publication No. 2-20,817.

Even though the speed of the engine generally relates to the output torque of the engine, the speed of the engine does not precisely relate to the output torque of the engine, much less the input torque for the transmission. Thus, a torque control apparatus in which the timing for reducing the torque is shifted on the basis of the speed of the engine does not always start the reduction of torque at an appropriate timing determined in accordance with the occurrence of torque on the side of the transmission during a gear shift. Accordingly, it is impossible to effectively prevent the occurrence of shocks due to the gear shift.

Moreover, during a gear shift in an automotive vehicle equipped with, for example, a four speed gear shift mechanism, transmitting torque is temporarily absorbed in the transmission gear mechanism by operation of elements such as clutches right after a shift starts. Consequently, a phenomenon in which acceleration in a lengthwise direction of the vehicle body falls down, i.e., a so called "pull-down" phenomenon, can occur. After the middle of the gear shift period, when the speed of the engine begins to be lowered, since the amount of engine torque transmitted to driving wheels is increased quickly, a phenomenon in which acceleration in the lengthwise direction of the vehicle body increases quickly, i.e., a so called "push-up" phenomenon, can occur. A "push-up" shock, therefore, can be produced.

In order to prevent such a push-up shock, an automotive vehicle equipped with an automatic transmission, in which the torque of the engine is reduced during shifting, has been proposed. Such a vehicle is described in, for instance, Japanese Unexamined Patent Publication No. 60-227,049 mentioned above. In this automotive vehicle, if the reduction of the torque and the occurrence of the pull-down phenomenon are synchronized, a drop of acceleration in the lengthwise direction is easily produced. This causes shocks and, especially, pull-down shocks.

In one other previously known automotive vehicle, a timing at which torque begins to reduce is retarded until a timing at which the pull-down phenomenon is over or the speed of the turbine begins to change due to the shifting operation. However, although the automotive vehicle is able to prevent deterioration of the pull-down phenomenon and the occurrence of a pull-down shock, it is still impossible to suppress push-up shock sufficiently.

SUMMARY OF THE INVENTION

It is one object of the present invention to provide a control apparatus for an engine and an automatic transmission in which reduction of output torque of the engine is precisely controlled by predicting an accurate termination speed of the reduction control.

It is another object of the present invention to provide a control apparatus for an engine and an automatic transmission in which output torque of the engine is reduced in response to a time at which shock from the gear shift tends to occur during a shift and, in particular, during a shift associated with friction elements furnished with a drift on ball.

It is a further object of the present invention to provide a control apparatus for an engine and an automatic transmission in which output torque of the engine is reduced, during an appropriate period, in response to input torque of the transmission, so that the occurrence of shocks during a gear shift is effectively prevented.

It is yet another object of the present invention to provide a control apparatus for an engine and an automatic transmission in which output torque of the engine is reduced so as to suppress push-up shocks effectively without causing the pull-down phenomenon to deteriorate.

The forgoing objects are accomplished, according to the present invention, by providing a particular control apparatus for an engine and an automatic transmission. The control apparatus includes reduction control starting means for starting a reduction in output torque of the engine, speed predicting means for predicting an input speed of the automatic transmission, and reduction control terminating means for terminating the reduction of the output torque. In the control apparatus, the input speed is monitored and is used as a basis for determining a timing at which the reduction starts and for predicting an input speed at the end of the reduction. When a negative variation ratio of the input speed drops to or below a predetermined value, reduction of the output torque starts. The prediction made by the speed predicting means is based on the input speed at a time at which the variation ratio drops to or below zero.

In accordance with another aspect of the invention, a control apparatus for an engine and an automatic transmission, which includes a friction locking element furnished with a drift on ball, reduces output torque of the engine in a torque reduction period during gear shifting associated with the friction locking element. The control apparatus includes torque reduction timing means for changing a timing from which the torque reduction period starts in response to input speed of the automatic transmission. By changing the timing, the output torque of the engine is reduced so that shocks during gear shifting are effectively prevented.

In accordance with another aspect of the invention, a control apparatus includes torque reduction timing means for changing a timing from which reduction of the torque starts in response to chasing of an input torque of said automatic transmission against variation of load of the engine.

In accordance with yet another aspect of the invention, a control apparatus includes torque reduction control means for reducing output torque of the engine and torque suppressing means for reducing output torque of the engine less than the torque reduction control means.

BRIEF DESCRIPTION OF THE DRAWINGS

The above and other objects and features of the present invention will be apparent to those skilled in the art from the following description of preferred embodiments thereof when considered in conjunction with the drawings, in which:

FIG. 29 shows characteristics at a high engine load, while FIG. 30 shows characteristics at a medium engine load.

DESCRIPTION OF THE PREFERRED EMBODIMENTS

Figure 1:
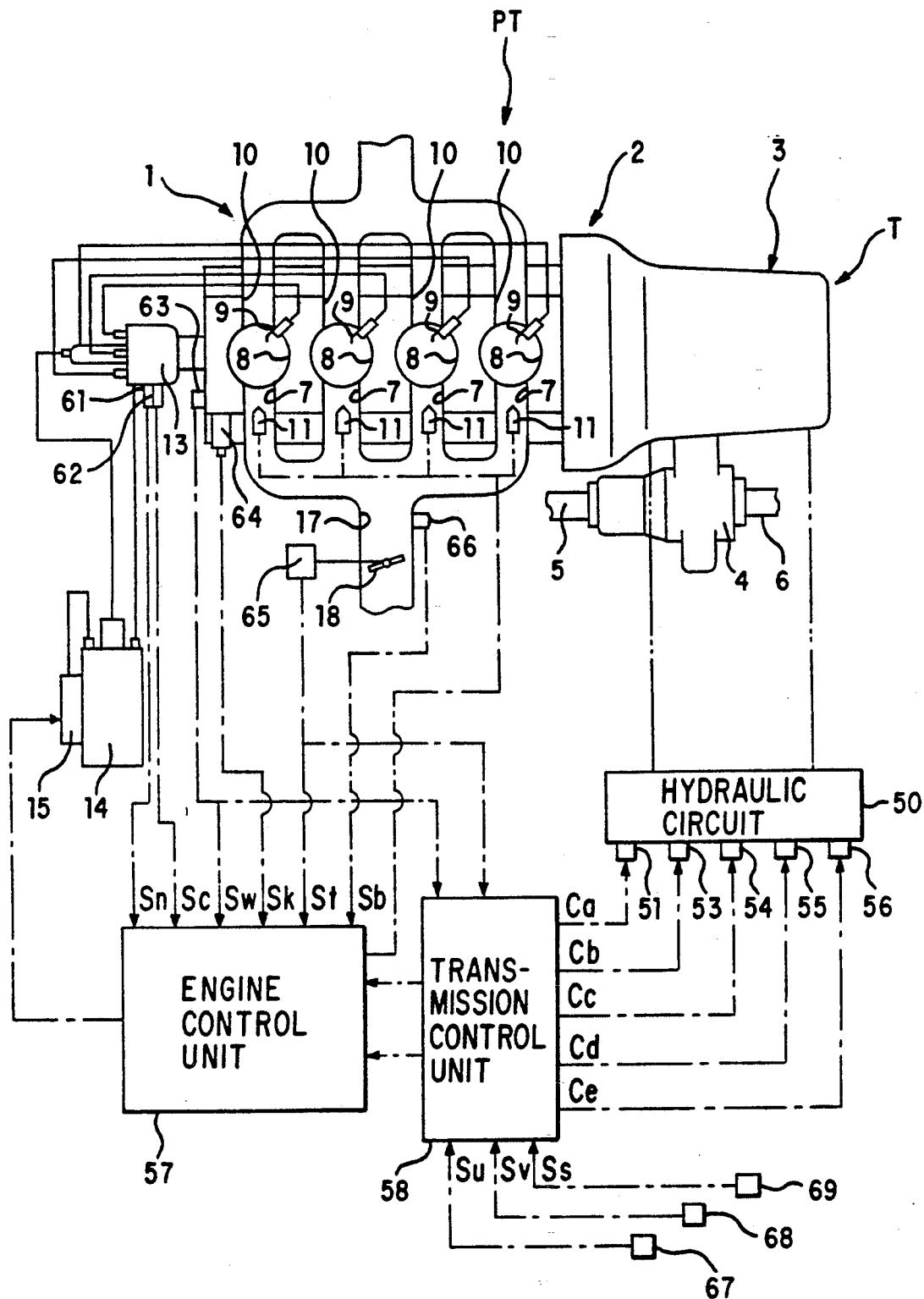
FIG. 1 is a schematic illustration showing an engine and an automatic transmission equipped with a control apparatus in accordance with a preferred embodiment of the present invention.

FIG. 1 shows a front engine, front drive type vehicle equipped with a transversely mounted power plant generally designated PT. The power plant PT includes a four cylinder engine 1 and an automatic transmission T. Output torque from the engine 1 is transmitted to left and right front axle shafts 5 and 6 through a differential apparatus 4 after the speed of the engine output shaft is appropriately changed by a torque converter 2 and a multi-stage transmission gear mechanism 3. Both the torque converter 2 and the mechanism 3 form part of the automatic transmission T.

In each respective cylinder of the engine 1, an air-fuel mixture is supplied to the cylinder 8 from an independent intake passage 7. After being compressed by a piston (not shown), the air-fuel mixture is ignited by an ignition or spark plug 9 and combusted or burned. Combustion gas from each respective cylinder is then exhausted through a respective independent exhaust passage 10. In each of the independent intake passages 7, a fuel injection valve 11 is provided for injecting fuel into intake air. Moreover, high voltage electric power for igniting the air-fuel mixture is supplied to the ignition plug 9 at a predetermined timing by a distributer 13, an ignition coil portion 14 and an ignition controller 15.

Each of the independent intake passages 7 is integrated into a common intake passage 17 at upstream sides thereof. In the common intake passage 17, a throttle valve 18, which is operated so as to open and close the common intake passage 17 in connection with movement of an acceleration pedal (not shown), is provided.

Figure 2:
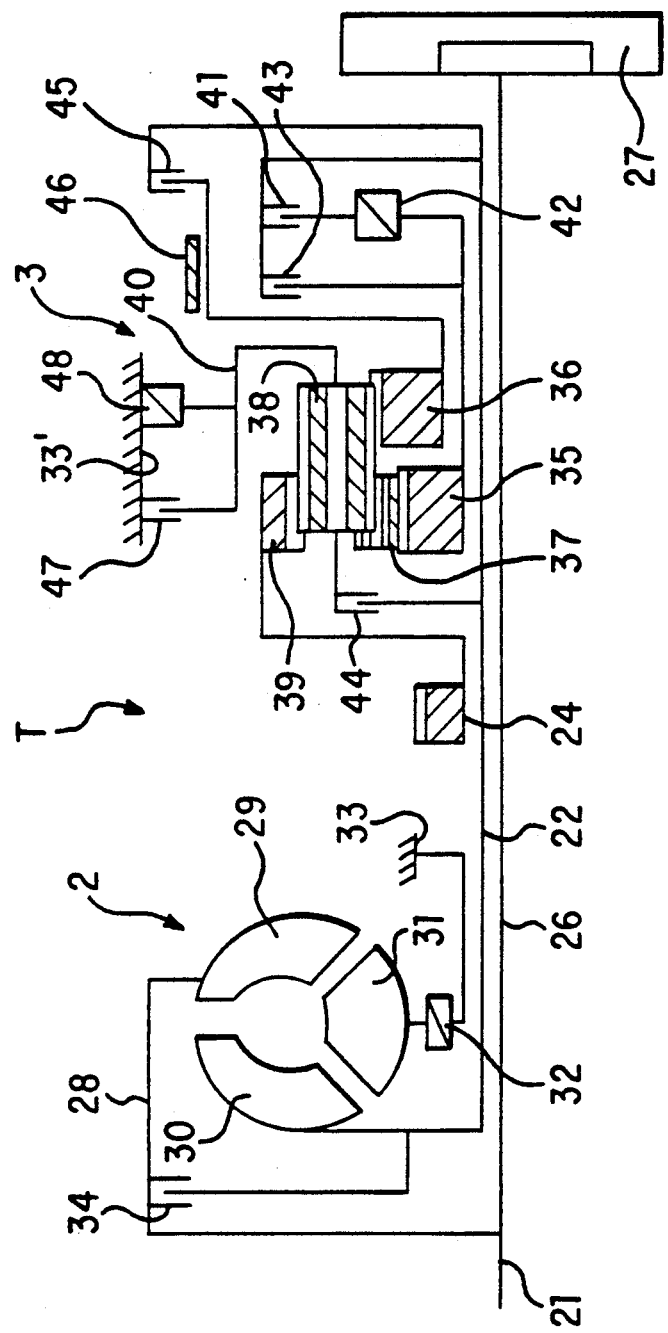
FIG. 2 is a skeleton diagram illustrating details of the automatic transmission of FIG. 1.

As shown in FIG. 2, in the automatic transmission T, the torque converter 2 transmits the torque supplied from an output shaft 21 of the engine to a turbine shaft 22 with an appropriate change in rotational speed. The transmission gear mechanism 3 outputs torque supplied from the turbine shaft 22 to the differential apparatus 4 (shown in FIG. 1) through an output gear 24 with either a further change in rotational speed or a reversal of rotation if the rearward or reverse drive stage is selected. The turbine shaft 22 is cylindrical so that it is formed into a "pipe" shape. A pump shaft 26, connected to the output shaft 21 of the engine, is provided in and extends through the hollow central portion of the turbine shaft 22. An oil pump 27 is rotatively driven by the pump shaft 26.

The torque converter 2 includes a pump 29 connected to the output shaft 21 through a connecting member 28, a turbine 30 connected to the turbine shaft 22 and rotatively driven by oil moved by the pump 29, and a stator 31. Oil is circulated to the turbine 30 from the pump 29, and rotation of the turbine occurs in a direction in which the rotation of the pump 29 takes place. The torque converter 2 changes the torque supplied by the output shaft 21 of the engine, based on a ratio of speed changes, in response to a difference in rotation speeds between the pump 29 and the turbine 30. The stator 31 is fixed to a transmission casing 33 through a one-way stator clutch 32. In order to reduce loss of power and elevate mileage performance, a lock-up clutch 34 is provided for directly connecting the output shaft 21 of the engine and the turbine shaft 22 in a predetermined operating or driving region.

The transmission gear mechanism 3 is an ordinary planetary gear system which is well known in the art. In the transmission gear mechanism 3, a small sun gear 35, which is relatively small in diameter, is loosely fitted to the turbine shaft 22 and a large sun gear 36, which is relatively large in diameter, is loosely fitted to the turbine shaft 22 at the rear (or right side in FIG. 2) of the small sun gear 35. A plurality of short pinion gears 37 (shown only partially) meshes with the small sun gear 35. A long pinion gear 38 is provided and has a front portion (at the left side of the gear 38 in FIG. 2) which meshes with the short pinion gear 37. A rear portion of the long pinion gear meshes with the large sun gear 36. A ring gear 39 meshes with the long pinion gear 38, and a carrier 40 supports the short pinion gear 37 and the long pinion gear 38 so that they are rotatable.

In the transmission gear mechanism 3, in accordance with the selected gear shift stages, one of the small sun gear 35, the large sun gear 36 and the carrier 40 becomes a torque input element. On the other hand, the ring gear 39 is the only torque output element in any gear shift stage. The ring gear 39 is connected to the output gear 24.

In order to change a torque transmission route in the transmission gear mechanism 3, or in order to switch either a speed change speed ratio or a rotational direction of the output gear 24, a plurality of clutches and brakes are provided.

More specifically, between the turbine shaft 22 and the small sun gear 35, a forward clutch 41 and a first one-way clutch 42 are provided, in series. A coast clutch 43 is provided in parallel with both clutches 41 and 42. Between the turbine shaft 22 and the carrier 40, a 3-4 clutch 44 is provided, and a reverse clutch 45 is provided between the turbine shaft 22 and the large sun gear 36. A 2-4 brake 46, which includes a brake band operated by a servo piston for fixing the large sun gear 36 at predetermined gear shift stages, is provided between the large sun gear 36 and the reverse clutch 45. Moreover, between the carrier 40 and the transmission casing 33', a low-reverse brake 47 for fixing the carrier 40 at predetermined gear shift stages and a second one way clutch 48 for receiving the opposing force of the carrier 40 are provided in parallel. Hereinafter, these clutches and brakes are collectively called "friction locking elements."

By arranging on and off patterns of the clutches 41, 42, 43, 44 and 45 and the brakes 46, 47, a variety of ranges, or gear shift stages, as shown in Table 1 are obtained. Hereinafter, referring to Table 1, a route of transmission of the torque and its gear shift character at each range or gear shift stage will be explained.

TABLE 1

| range | | clutch | | | | brake | | one-way clutch | |
|---|---|---|---|---|---|---|---|---|---|
| | | forward | coast | 3-4 | reverse | 2-4 | n-reverse | first | second |
| P | | | | | | | | | |
| R | | | | | o | | o | | |
| N | | | | | | | | | |
| D | 1 speed | o | | | | | | o | o |
| | 2 speed | o | | | | o | | o | |
| | 3 speed | o | o | o | | | | o | |
| | 4 speed | o | | o | | o | | | |
| 2 | 1 speed | o | | | | | | o | o |
| | 2 speed | o | o | | | o | | o | |
| | 3 speed | o | o | o | | | | o | |
| 1 | 1 speed | o | o | | | | o | o | o |
| | 2 speed | o | o | | | o | | o | |

The symbol "○" designates a condition in which clutches and brakes are frictionally engaged or, with regard to the one-way clutches, locked.

(1) In the P range condition, all friction locking elements are "off" or disengaged. In this case, torque from the turbine shaft 22 is not transferred to the transmission gear mechanism 3.

(2) In the R range condition, the reverse clutch 45 and the low-reverse brakes 47 are "on" or engaged, and the other friction locking elements are off. The first and second one-way clutches do not provide any particular effects in these ranges.

Torque from the turbine shaft 22 is input to the large sun gear 36 through the reverse clutch 45. The large sun gear 36, the long pinion gear 38 and the ring gear 39 serve as a fixed gear line engaging in this order. The torque input to the large sun gear is changed by a large reduction ratio determined by the number of teeth of the large sun gear 36 and the number of teeth of the ring gear 39. Appropriately reduced torque is output by the output gear 24. In the R range, the ring gear 39 and the output gear 24 rotate in a direction opposite to that in which the large sun gear 36 and the turbine shaft 22 rotate, and the front axle shafts 5, 6 (shown in FIG. 1) are driven in a rearward driving direction.

(3) In the N range condition, the friction and locking elements are in the same condition as in the P range condition.

(4) In the D range, 1-speed condition the forward clutch 41 is on or engaged, and the other friction locking elements are off or disengaged. The first and second one-way clutches 42 and 48 are ordinarily in a locking mode, but are idle when coasting.

The torque of the turbine shaft 22 is input to the small sun gear 35 through the forward clutch 41 and the first one way clutch 42. The small sun gear 35, the short pinion gear 37, the long pinion gear 38 and the ring gear 39 serve as a fixed gear line, engaging in this order. In this case, the torque input to the small sun gear 35 is shifted by a large reduction ratio determined by the number of teeth of the small sun gear 35 and the number of teeth of the ring gear 39. The torque is output to the output gear 24. The ring gear 39 and the output gear 24 rotate in the same direction as the small sun gear 35 and the turbine shaft 22, and the front axle shafts 5 and 6 (seen in FIG. 1) are driven in a forward driving direction. In the D range, 1-speed condition, engine braking is not obtained, because of the operation of the first one way clutch 42.

(5) In the D range, 2-speed condition, the forward clutch 41 and the 2-4 brake 46 are on, and the other friction locking elements are off. The first one way clutch 42 is ordinarily in a locking mode, but idles when coasting. The second one way clutch 48 idles at all times.

Since the large sun gear 36 is fixed, the long pinion gear 38 revolves around the large sun gear 36 and spins. Accordingly, torque is transmitted in basically the same route as in the D range, 1-speed condition. However, since the rotation speed of the ring gear 39 is made higher by revolution of the long pinion gear 38, the reduction ratio is smaller in the D range, 1-speed condition. In the D range, 2-speed condition, engine braking is not obtained. This is because of the operation of the first one-way clutch 42.

(6) In the D range, 3-speed condition, the forward clutch 41, the coast clutch 43 and the 3-4 clutch 44 are on, and the other friction locking elements are off. The first one-way clutch 42 provides no particular effects. The second one-way clutch 48 idles at all times.

Since the small sun gear 35 and the carrier 40 are locked to each other through the coast clutch 43, the turbine shaft 22 and the 3-4 clutch 44, all the gears 35 to 39 and the carrier 40 are fixed together and rotated as a unit, as is common in planetary gear systems. The turbine shaft 22 and the output shaft 24 are directly connected. Therefore, torque from the turbine shaft 22 is transmitted to the output shaft 24 with a reduction ratio of 1, i.e., without changing the rotational output speed. Moreover, in the D range, 3-speed condition, which is a "direct coupling" mode, engine braking is obtained.

(7) In the D range, 4-speed condition, the forward clutch 41, the 3-4 clutch 44 and the 2-4 brake 46 are on, and the other friction locking elements are off. The first and second one-way clutches 42 and 48 idle at all times.

The torque from the turbine shaft 22 is input to the carrier 40 through the 3-4 clutch 44, and the torque from the carrier 40 is transmitted to the output gear 24 through the long pinion gear 38 and the ring gear 39, in this order. Since the large sun gear 36 is fixed by the 2-4 brake 46, the long pinion gear 38 revolves around the large sun gear 36 and spins. Accordingly, since the rotation speed of the ring gear 39 is made higher than that of the carrier 40 or the turbine shaft 22 by spinning of the long pinion gear 38, the transmission gear mechanism 3 enters into an overdrive (increasing speed) mode.

(8) In the 2 range, 1-speed condition, the friction and locking elements are in the same conditions as in the D range, 1-speed condition.

(9) In the 2 range, 2-speed condition, the forward clutch 41, the coast clutch 43 and the 2–4 brake are on, and the other friction locking elements are off. The first one-way clutch 42 provides no particular effects. The second one-way clutch 48 idles.

In this case, the transmission of torque and the characteristics of speed change are basically the same as in the D range, 2-speed condition. However, engine braking is obtained because the first one-way clutch 42 does not operate.

(10) In the 2 range, 3-speed condition, the friction and locking elements are in the same conditions as in the D range, 3-speed condition.

(11) In the 1 range, 1-speed condition, the forward clutch 41, the coast clutch 43 and the low reverse brake are on, and the other friction locking elements are off. The first and second one-way clutches 42 and 48 provide no particular effects.

In this case, the transmission of torque and the speed change characteristics are basically the same as in the D range, 1-speed condition. However, engine braking is obtained because the first and second one-way clutches 42 and 48 do not work.

(12) In the 1 range, 2-speed condition, the friction and locking elements are in the same conditions as in the 2 range, 2-speed condition.

Figure 3:
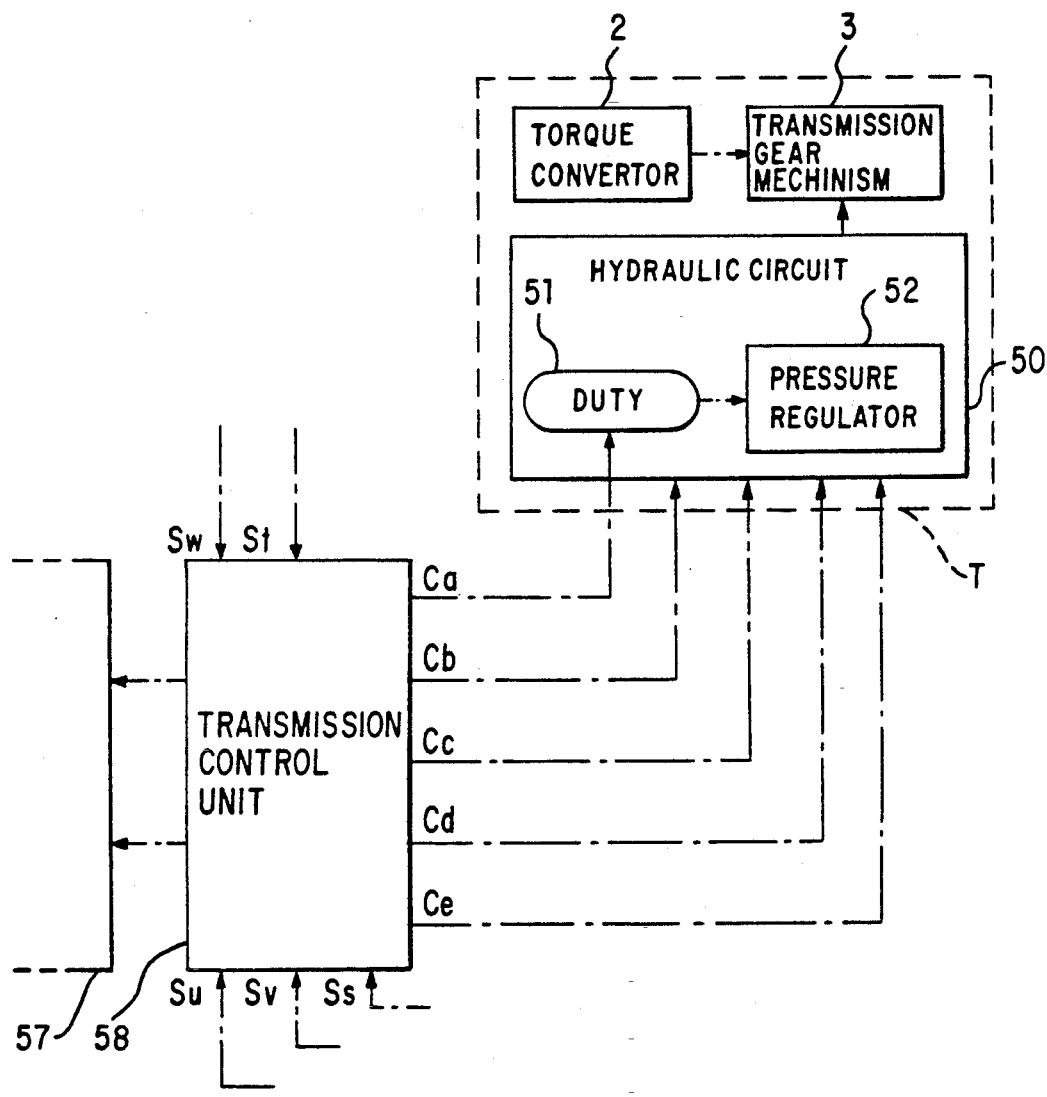
FIG. 3 is a block diagram illustrating details of a hydraulic control mechanism of FIG. 1.

As is apparent from FIG. 3, in order to provide the on and off patterns shown in reference Table 1 to the friction locking elements of the multi-stage transmission gear mechanism 3 so as to switch between selected gear ranges or shift stages, a hydraulic circuit portion 50 is provided. The hydraulic circuit portion 50 itself is an ordinary and conventional hydraulic mechanism and, therefore, is not shown in detail. The hydraulic circuit portion controls the transmission as will be described. In the hydraulic circuit portion 50, operational oil is supplied from the oil pump 27 (shown in FIG. 2). By adjusting the oil pressure of the operational oil via the pressure regulator valve 52, in accordance with a driving condition of the vehicle, a line pressure is produced. The line pressure is supplied to or released from the predetermined friction locking elements of the transmission gear mechanism 3 in accordance with a position of the gear or speed range selected by the manual valve and a shift position of each shift valve. Switching of the selected gear range or gear shift stage is performed.

In the hydraulic circuit portion 50, the pressure regulator valve 52 produces a line pressure corresponding to a pilot pressure produced by a duty solenoid valve 51 for controlling line pressure. Each shift valve, not shown, is shifted by a respective first to fourth solenoid valve 53, 54, 55 and 56 (shown in FIG. 1). Moreover, the duty solenoid valve 51 for controlling line pressure and the first to fourth solenoid valves 53 to 56 are controlled by a transmission control unit 58.

Hereinafter, using the 3–4 clutch 44, having a "drift-on" ball, as an example, details of a hydraulic operation mechanism of the friction locking elements will be explained.

Figure 4:
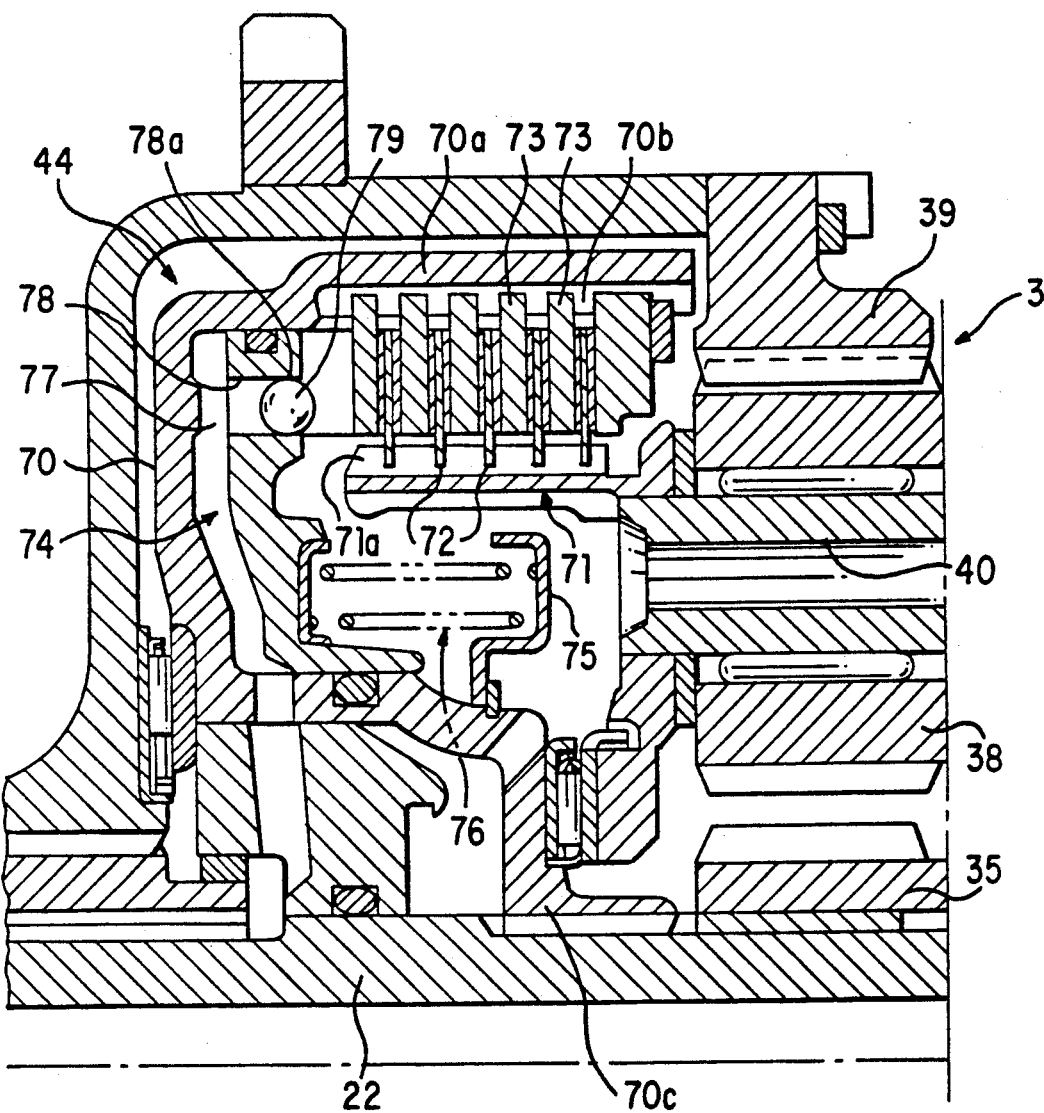
FIG. 4 is a vertical sectional view showing a 3-4 clutch of the automatic transmission of FIG. 1.

As shown in FIG. 4, in the 3–4 clutch 44, a clutch drum 70, in which a spline 70b is formed at a surface of an inner periphery of a cylinder portion 70a, and a clutch hub 71, on which a spline 71a is formed at a surface of an outer periphery thereof, are provided. A plurality of friction plates 72, connected to the spline 71a of clutch hub 71, and a plurality of friction plates 73, connected to the spline 70b of clutch hub 70, are arrayed so that they overlap alternatively in an axial direction of the turbine shaft (i.e., in the left or right direction in FIG. 4). Moreover, a hydraulic piston 74 is provided for connecting the friction plates 72 and the friction plates 73 to each other by friction when operational oil pressure is supplied. The hydraulic piston 74 can be given a force in an unlocking direction (toward the left in FIG. 4) at any time by a plurality of return springs 76 disposed between the hydraulic piston 74 and a ring shaped spring retainer 75 which is provided at an inner part of the cylinder portion 70a of the clutch drum 70. Moreover, the return spring 76 is coaxially disposed around the axial center line of the turbine shaft.

A boss portion 70c of the clutch drum is connected in series with cylinder portion 70a. The boss portion 70c is fitted onto the turbine shaft 22 by a spline. The clutch hub 71 is connected to the carrier 40 of the transmission gear mechanism 3.

At the periphery of the hydraulic piston 74, a plurality of pressure leak passages 78, only one of which is shown, is provided. The passages 78 provide a channel between a hydraulic chamber 77, which is formed behind the hydraulic piston 74 (i.e., on the left side in FIG. 4) and a chamber 80 on a side of the friction plates 72 and 73. A tapered valve fitting surface 78a is formed in a pressure leak passage 78. A drift-on ball 79, which fits closely with the valve fitting surface 78a, is provided in the pressure leak passage 78. Opening and closing of the pressure leak passage 78 is performed by the drift-on ball 78.

In such a 3–4 clutch 44, when operational oil is supplied to the hydraulic chamber 77 by the hydraulic circuit portion 50 (shown in FIG. 1), the drift on ball closes the pressure leak passage 78. At this time, under the operational oil pressure, the oil piston 74 is moved against an opposing elastic force provided by the return spring 76. Due to this, the friction plates 72 and the friction plates 73 are locked to each other. In this situation, torque transmitted from the turbine shaft 22 to the clutch drum 70 is transmitted to the carrier 40 through the clutch hub 71.

Moreover, when operational oil in the hydraulic chamber 77 is released, the position of the drift-on ball 79 shifts, in a known manner, under the effect of centrifugal force. Consequently, the pressure leak passage 77 is open. Therefore, operational oil in the hydraulic chamber 77 is quickly drained, and the hydraulic piston 74 is pushed back by elastic force of the return spring 76. As a result, the frictional connection between the friction plates 72 and the friction plates 73 is interrupted and power transmission from the turbine shaft 22 to the carrier 40 is cut.

Referring again in FIG. 1, an engine control unit 57 is provided for performing various predetermined controls for the engine 1. A transmission control unit 58 performs various predetermined transmission controls for the automatic transmission T. The engine control unit 57 and the transmission control unit 58 together form part of a control apparatus which includes a micro computer and, for example, torque reduction means and reduction timing collecting means according to the present invention.

An engine speed signal Sn, output from a engine speed sensor 61 disposed on the distributer 13, a crank angle signal Sc, output from a crank angle sensor 62, a cooling water temperature signal Sw, output from a water temperature sensor 63, a knocking intensity signal Sk, output from a knocking sensor 64, a throttle open degree signal St, output from a throttle open degree sensor 65 disposed at the throttle valve 18, a boost signal Sb, output from a boost sensor 66 disposed in or on the common intake passage 17, an air intake amount signal, and so on, are input as control parameters or information to the engine control unit 57. Moreover, predetermined signals indicating, for example, a gear shifting condition are input to the engine control unit 57 from the transmission control unit 58. Then, the engine control unit 57 performs predetermined engine controls, such as an ignition timing control or a fuel cut control, on the basis of the control information. Subsequently, the engine control unit performs torque reduction controls, which will be explained later, during shifting of the automatic transmission T in order to avoid the occurrence of shocks during gear shifts.

The fuel injection control is performed by adjusting a fuel injection pulse width provided by the fuel injection valve 11 so that a proper air/fuel mixture having a predetermined air/fuel (A/F) ratio, which is set by the driving condition of the engine 1, is obtained. The predetermined A/F ratio is obtained from an air fill-up or displacement volume of the cylinder 8, calculated on the basis of the engine speed, air intake rate, intake air temperature, and so on.

The ignition timing control is performed by calculating an "ignition preceding angle" value in accordance with a drive condition of the engine 1 and an ignition timing control signal, which is output to the ignition controller 15 at a timing determined by the ignition preceding angle value and the crank angle signal. According to the ignition timing control signal, high voltage electric power for ignition is supplied to each ignition plug 9 from the ignition coil portion 14 through the distributer 13 at a predetermined timing. Generally, the output torque of the engine 1 is lowered as the ignition timing (or angle) is retarded. By utilizing this, when the torque of the engine 1 is reduced during gear shifting, the ignition timing is forcibly retarded by a predetermined value.

The torque reduction control during gear shifting is performed according to the flowchart shown in FIG. 15, as will be explained later.

A cooling water temperature signal Sw, output from a water temperature sensor 63, a throttle open degree signal St, output from a throttle open degree sensor 65, a turbine speed signal Su, output from a turbine speed sensor 67, a vehicle speed signal Sv, output from a vehicle speed sensor 68, a select position signal Ss for the select lever, output from a position sensor 69, and so on, are input to the transmission control unit 58 as control information. Then, the transmission control unit 58 performs a predetermined transmission control, based on the control information.

The transmission control is performed by applying drive signals Ca, Cb, Cc, Cd, Ce to the duty solenoid valve 51 for controlling line pressure and the first to fourth solenoid valves 53 to 56, respectively, in accordance with the select position signal, indicative of a particular gear or operating range (P, R, N, D, 2, or 1) selected, throttle opening degree, and vehicle speed. On and off patterns for the friction locking elements are changed, so that the transmission control changes gear shift stages in accordance with the selected range and drive condition of the vehicle. For example, when the D range is selected, gear shift stages are automatically switched in response to the throttle opening degree and the vehicle speed according to a map for gear shift control shown in FIG. 5.

The engine control unit 57 performs not only the various ordinary engine controls mentioned above, but also a torque reduction control during gear shifting in order to prevent the occurrence of the shocks from gear shifting. The torque reduction control is performed after receiving various signals applied to the engine control unit from the transmission control unit 58 during a gear shift of the automatic transmission T.

A reduction control of the output torque of the engine 1 by the engine control unit 57, namely, a fuel cut control during upshifting, will now be explained. The explanation which follows is based on the control flowcharts of FIGS. 7 and 8.

Figure 7:
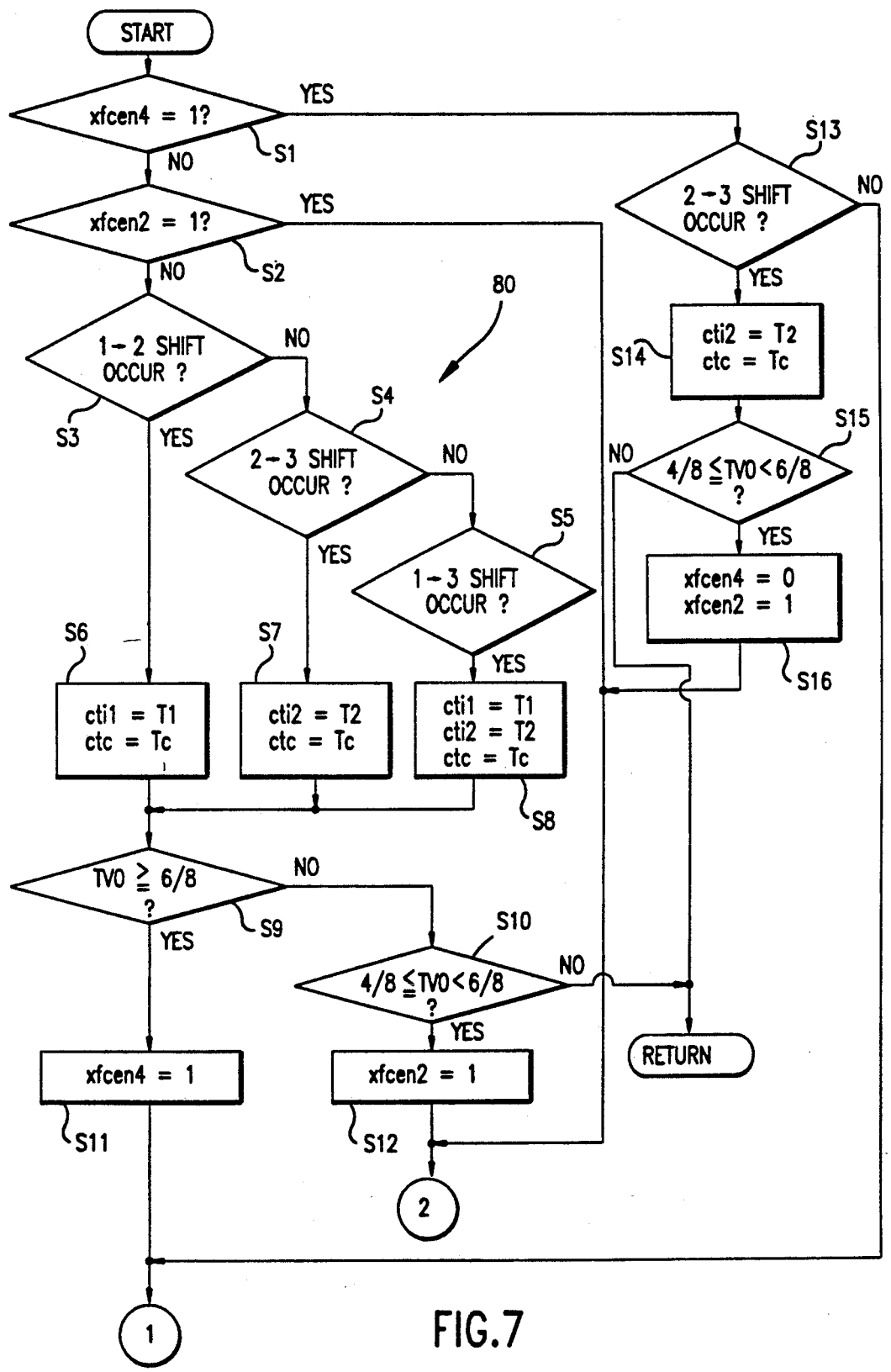
FIGS. 7 and 8 are flowcharts showing a fuel cut control in the control apparatus during upshifting.

Reference is initially made to FIG. 7. The states of a four-cylinder cut condition completion flag xfcen4 and a two-cylinder cut condition completion flag xfcen2 are determined at steps S1 and S2, respectively. At the beginning of operation, commonly, the states are xfcen4=xfcen2=0, representing four-cylinder and two-cylinder cut incompletion conditions. If the answers to the decisions made in step S1 and S2 are no, determinations are made as to whether or not a gear shift from the 1-speed gear to the 2-speed gear, from the 2-speed gear to the 3-speed gear, or from the 1-speed gear to the 3-speed gear has occurred in steps S3, S4, and S5, respectively. If a gear shift from the 1-speed gear to the 2-speed gear has occurred, an inhibit time cti1 for fuel cut control during the gear shift from the 1-speed gear to the 2-speed gear is set to T1 to avoid malfunctions at a step S6, and a fuel cut control time ctc is set to Tc. Similarly, if a gear shift from the 2-speed gear to the 3-speed gear has occurred, an inhibit time cti2 for fuel cut control during the gear shift from the 2-speed gear to the 3-speed gear is set to T2 at a step S7, and fuel cut control time ctc is set to Tc. If a gear shift from the 1-speed gear to the 3-speed gear has occurred, the inhibit times cti1 and cti2 are set to T1 and T2, respectively, at a step S8, and fuel cut control time ctc is set to Tc.

The opening TVO of the throttle valve 18 is determined in steps S9 and S10. If the degree of throttle valve opening TVO is equal to or above 6/8, the answer to the decision made in step S9 is yes, and it is judged that the four-cylinder cut condition is completed. At step S11, therefore, the completion flag xfcen4 is set to 1. If the opening TVO is equal to or above 4/8 and below 6/8, the answer to the decision made in step S9 is no, the answer to the decision made in step S10 is yes, and it is judged that the two-cylinder cut condition is completed. At step S12, therefore, the completion flag xfcen2 is set to 1. If the opening TVO is below 4/8, the fuel cut control is not performed and return to the beginning of the program is immediately performed.

If the four-cylinder cut condition completion flag xfcen4 is determined to be equal to 1 at step S1, in step S13, it is determined whether or not a gear shift from the 2-speed gear to the 3-speed gear has occurred. If a gear shift from the 2-speed gear to the 3-speed gear has occurred, after setting the inhibit time cti2 for fuel cut control during the gear shift from the 2-speed gear to the 3-speed gear equal to T2 in step S14 and setting the fuel cut control time ctc equal to Tc, if, in step S15, it is determined that the degree of throttle valve opening TVO is equal to or above 4/8 and below 6/8, the four cylinder cut condition completion flag xfcen4 is set to 0 and the two-cylinder cut condition completion flag xfcen2 is set to 1 in step S16.

Figure 8:
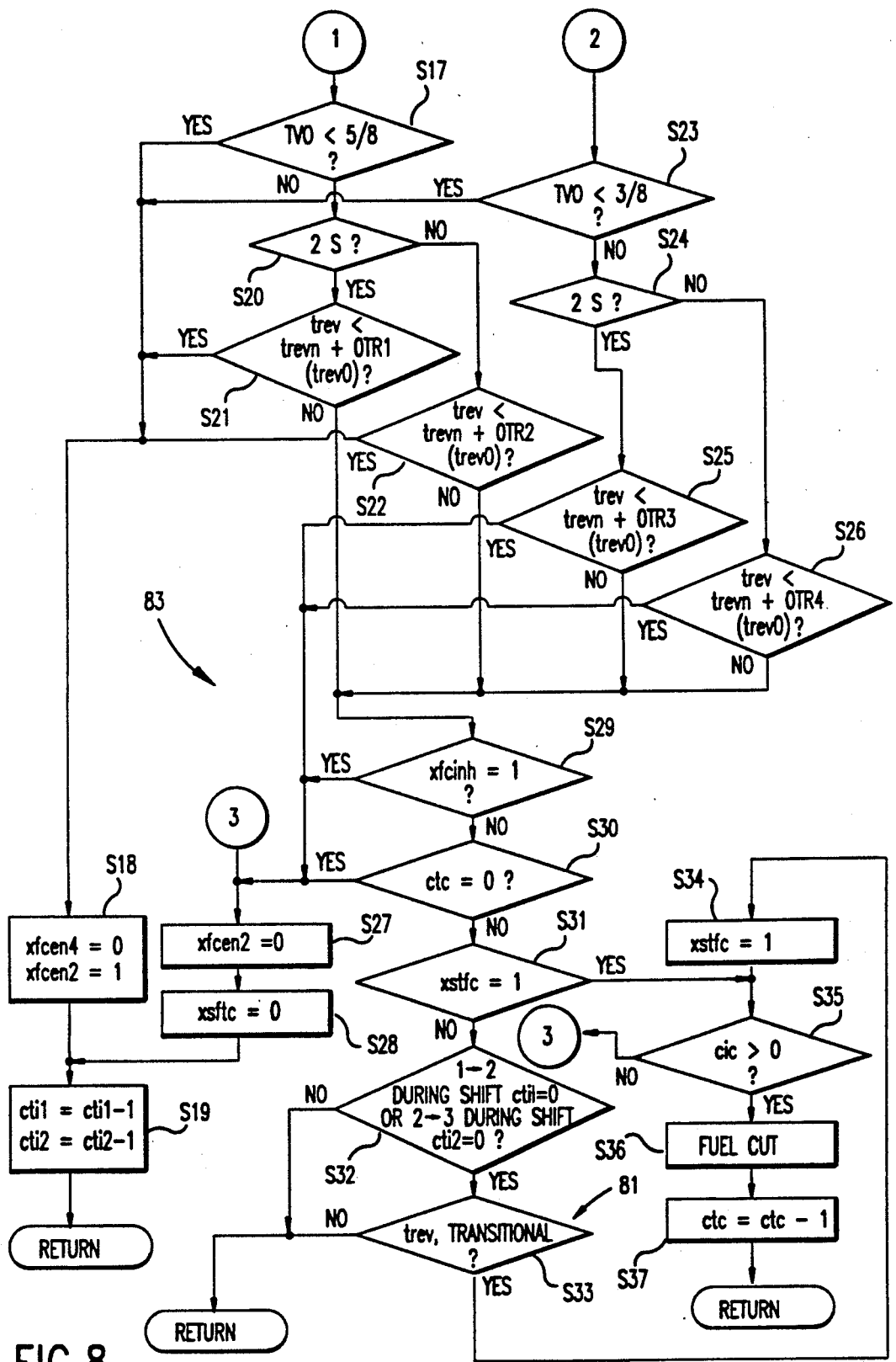

After this, a termination timing of the fuel cut control is determined during steps S17 through S30 represented in FIG. 8. A start timing of the fuel cut control is determined during steps S31 through S37, also represented in FIG. 8.

First, the detection of the starting timing of the fuel cut control will be explained. At a step S31, a decision as to whether or not a fuel-in-cut flag xsffc is equal to 1 is made. If the flag xsffc is equal to 1, fuel cutting is occurring. At the beginning of operation, since xsffc is equal to 0, the answer to the decision made in step S31 is no. Then, in step S32, a decision is made as to whether or not either of the inhibit times cti1 or cti2 of the fuel cut control, during gear shifts from the 1-speed gear to the 2-speed gear and from the 2-speed gear to the 3-speed gear, is equal to 0. If the inhibit time has passed, and the answer to the decision made in step S32 is yes, a decision is made in step S33 as to whether or not a variation of the turbine speed trev has reached a transitional point, namely, a starting point of the fuel cut control. If such variation is at the transitional point, the fuel-in-cut flag xsffc is set to 1 at step S34.

Figure 9:
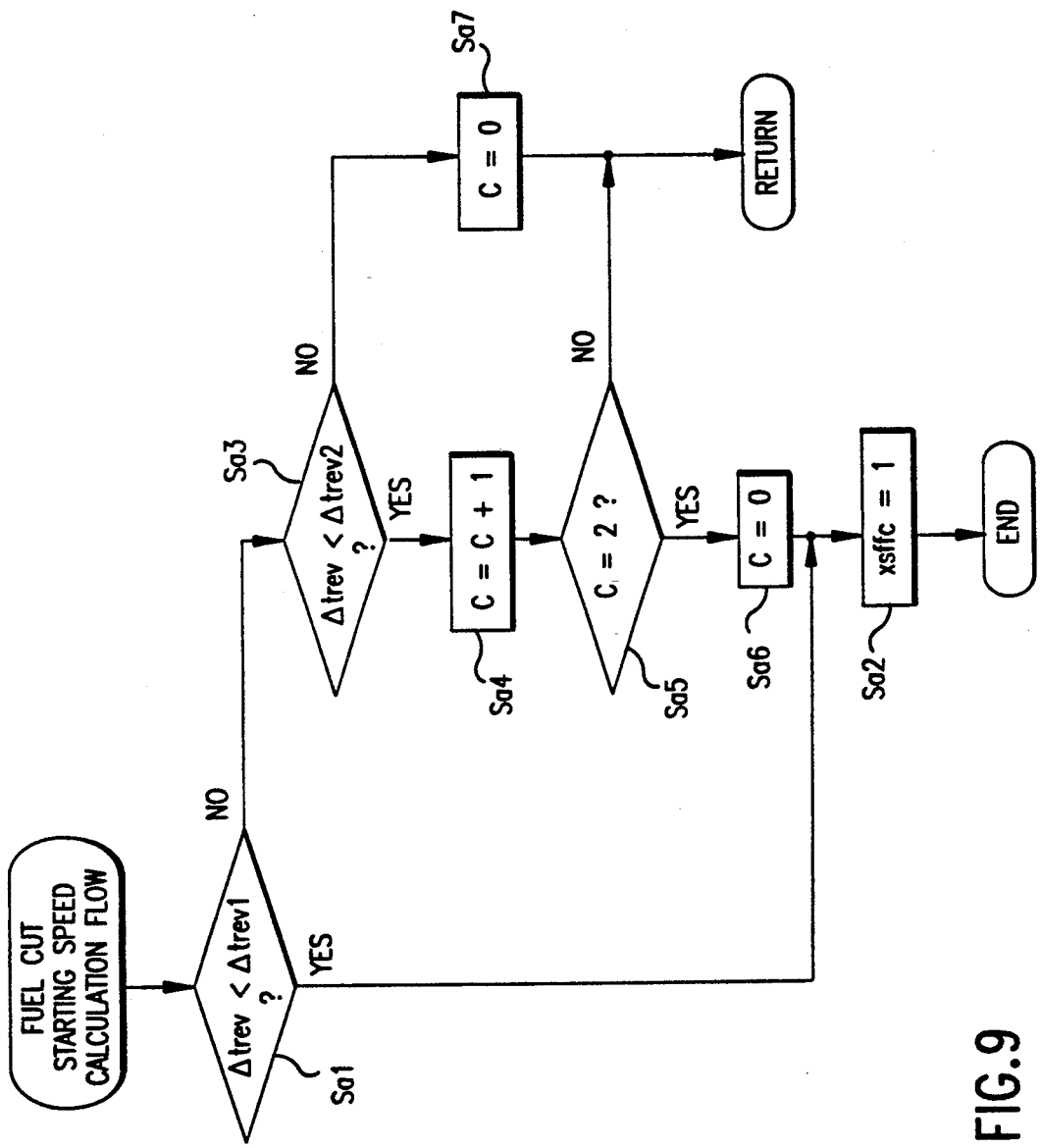
FIG. 9 is a flowchart showing a calculation of a fuel cut control starting speed.

The determination as to whether or not the variation of the turbine speed is at the transitional point or not is outlined specifically in FIG. 9. From FIG. 9, it can be seen that if, in step Sa1, it is determined that the variation $\delta$trev of the turbine speed exceeds a predetermined value $\delta$trev1 (i.e., $-50$ r.p.m.) at a step Sa1, xsffc is immediately set to 1 at a step Sa2. If it is determined that the variation $\delta$trev of the turbine speed exceeds a value $\delta$trev2 (i.e., $-10$ r.p.m.), smaller than the predetermined value $\delta$trev1, at a step Sa3, a counting number c is increased by 1 at a step Sa4. If it is determined that the counting number c is equal to 2 at a step Sa5, after resetting the counting number c to 0 at a step Sa6, the fuel-in-cutting flag xsffc is set to 1 at a step Sa2. Moreover, if, from steps Sa1 and Sa3, it is determined that the variation $\delta$trev of the turbine speed is below both predetermined values $\delta$trev1 and $\delta$trev2, the counting number c is reset to 0 at step Sa7.

After starting the fuel cut control mentioned above, as shown in FIG. 8, whether or not the fuel cut control time ctc is equal to 0 is discriminated at a step S35. Since the fuel cut control time ctc is above 0 at the starting time, the fuel cut control is started at a step S36 and, in step S37, the fuel cut control time ctc is decreased to ctc−1.

The detection of the termination timing of the fuel cut control after a step S17 will now be explained. First, when the four-cylinder cut condition completion flag xfcen4 is determined in step S11 to be equal to 1, if the opening degree TVO of the throttle valve 18 is determined in step S17 to be below 5/8, i.e., small, after the four-cylinder cut condition completion flag xfcen4 is set to 0 at step S18 and the two-cylinder cut condition completion flag xfcen2 is set to 1, each inhibit time cti1 and cti2 of the fuel cut control is decreased by 1 in step S19.

On the other hand, if it is determined in step S17 that the opening degree TVO of the throttle valve 18 is equal to or above 5/8, or large, the gear shift stage is detected and a decision is made at a step S20. If the gear shift stage is the second speed, the answer to the decision made at step S20 is yes, and a decision as to whether or not the turbine speed trev has reached a terminating speed (trevn+OTR 1 or 2) in the fuel cut control is made at step S21 or S22. Here, trevn is a turbine speed at the terminating timing, and its calculation is performed by a calculation represented by the flowchart of FIG. 10.

Figure 10:
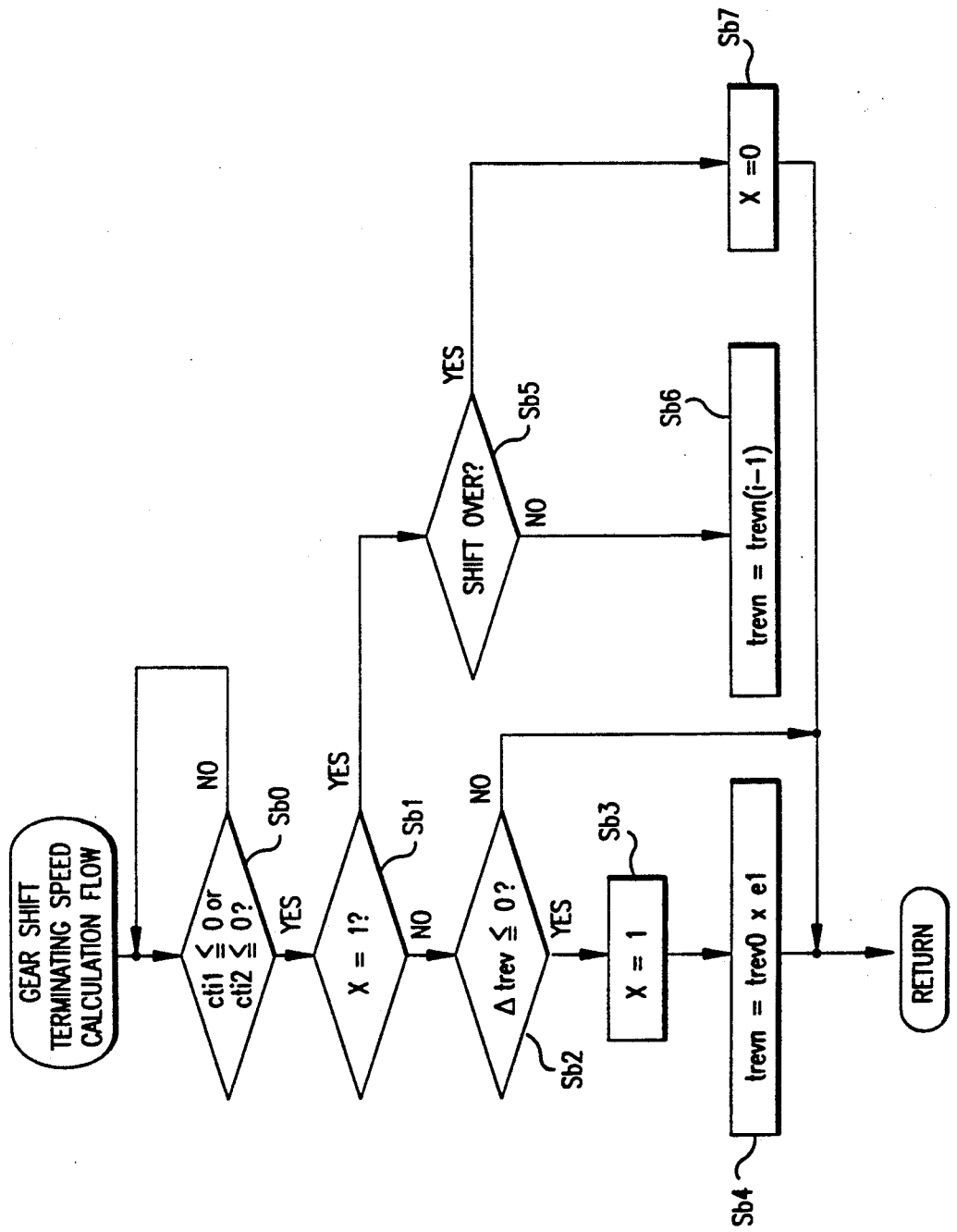
FIG. 10 is a flowchart showing a calculation of a predicted speed of a turbine shaft at a time at which a gear shift is terminated.

As may be seen from FIG. 10, after waiting, at a step Sb0, until either of the inhibit times cti1 or cti2 of the fuel cut control, during gear shifts from the 1-speed gear to the 2-speed gear and from the 2-speed gear to the 3-speed gear, are equal to or below 0, i.e., have expired, a value of a condition completion flag x for calculation of the terminating timing is detected, and a decision is made at a step Sb1 as to whether or not x=1. At the beginning, since x=0 (condition incompletion), the answer to the decision made in step Sb1 is no, and the variation ratio $\delta$trev of the turbine speed is discriminated at a step Sb2. If the variation ratio $\delta$trev is equal to or below 0, by judging condition completion, the flag x is set to 1 at step Sb3, and by multiplying the turbine speed trevo at the timing of which $\delta$trev is equal to or below 0 by a gear ratio e1 of the gear shift stage at the timing at a step Sb4, the turbine speed trevn at the terminating timing is predicted. If x=1 at step Sb1, a decision as to whether or not a timing at which the end of gear shifting has occurred or has passed is made at step Sb5. If the gear shifting has not ended and the answer to the decision made in step Sb5 is no, the predicted turbine speed trevn of the terminating timing is held at a step Sb6 and return to the main program is performed. If gear shifting has ended, the flag x is reset to 0 at a step Sb7 and return is performed. Moreover, the value OTR, added to the predicted turbine speed trevn in step S21 or S22, which is predicted in such a manner, is calculated on the basis of the turbine speed trevo at the start of gear shifting when the variation ratio $\delta$trev is equal to or below 0. The value OTR1(trevo), when the gear shift stage is the second gear or speed, and the value OTR2(trevo), when the gear shift stage not in the second gear, are different from each other.

If the turbine speed trevo is lowered below trevn+OTR, in order to switch the fuel cut control from four-cylinder to two-cylinder control, the flow goes to steps S18 and S19.

When the two-cylinder cut condition completion flag xfcen2 is set equal to 1 and the opening TVO of the throttle valve 18 is determined, in step S23, to be above 3/8, or large, the gear shift stage is detected and a decision is made at a step S24. If the gear shift stage is determined to be the second speed, the answer to the decision made at step S24 is yes. If the gear stage is determined to be other than the second speed, the answer to the decision made at step S24 is no. Whether or not the turbine speed trev has reached a terminating speed (trevn+OTR) of the fuel cut control or not is discriminated at step S25 or step S26, depending on the answer to the decision made at step S24, in a manner similar to that mentioned above. The value OTR3(trevo), when the gear shift stage is the second gear stage or speed, and the value OTR4(trevo), when the gear shift stage is not the second gear stage or speed, are different from each other.

If the turbine speed trevo is lowered below trevn+OTR, in order to terminate the two-cylinder fuel cut control, by going to the steps S27 and S28, the two-cylinder cut condition completion flag xfcen2 is set to 0 and the fuel-in-cutting flag xsffc is set to 0.

On the other hand, if the turbine speed trevo is equal to or above trevo+OTR, or high, at step S29, a decision as to whether or not an inhibit condition flag xfcinh for the fuel cut control is equal to 1 is made and, at a step S30, a decision as to whether or not the fuel cut control time ctc is equal to 0 is made. If xfcinh=1 (completion of inhibit condition) or ctc=1, the program goes to step S27 to terminate the fuel cut control. Otherwise, the program goes to steps following step S31 for detection of the starting speed of the fuel cut control. Here, a fuel cut control inhibit condition occurs during a downshift or an upshift from the 3-speed gear to the 4-speed gear, when cooling water for the engine is low, upon a malfunction of the turbine speed sensor 67 and the solenoid valves 51, 53 to 56, upon a malfunction of the throttle opening degree sensor 67, upon a malfunction of an intake temperature sensor, upon a malfunction of the cooling water temperature sensor 63, and upon a malfunction of the air flow sensor.

Figure 6:
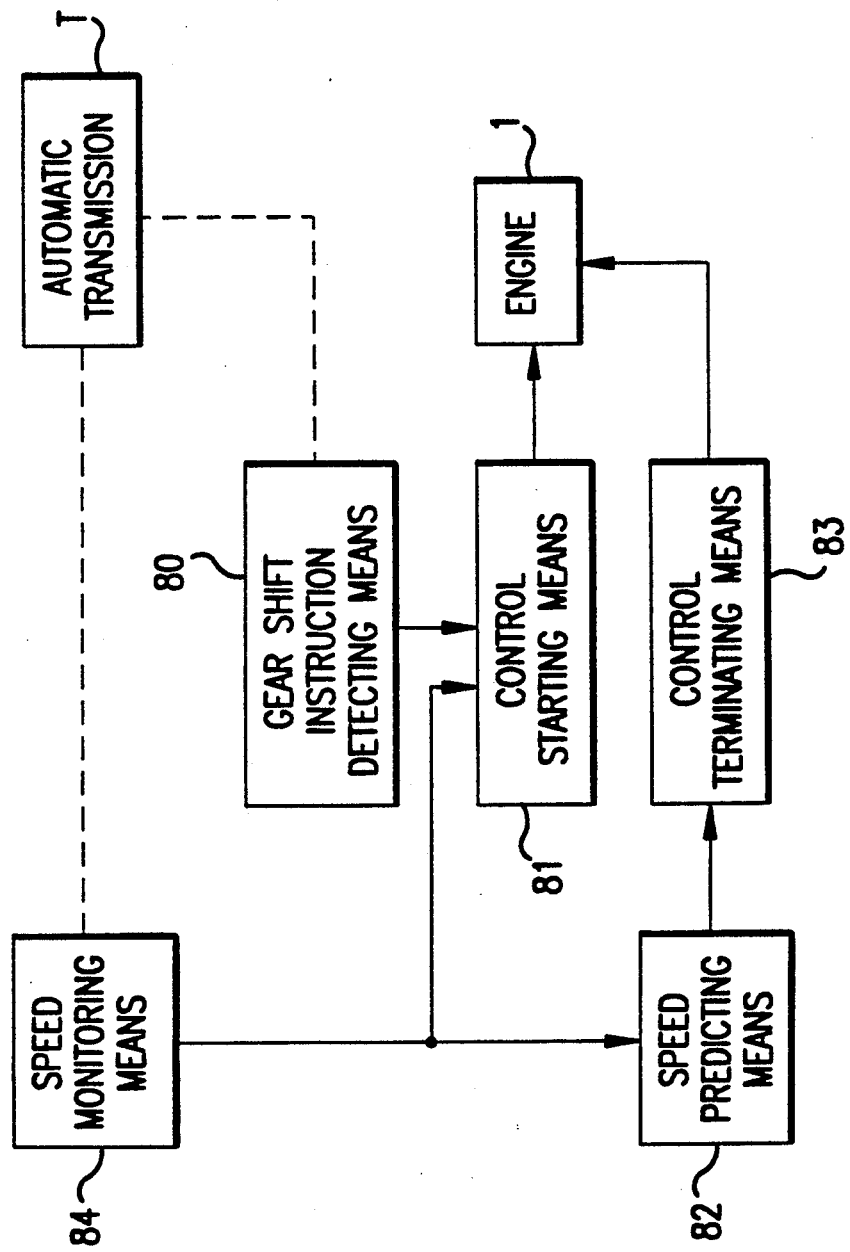
FIG. 6 is a block diagram showing a structure of a control apparatus in accordance with a preferred embodiment of the present invention.

With regard to the control flow shown in FIGS. 7 and 8, the steps S3, S4, S5 and S13 form gear shift instruction timing detecting means 80, shown in FIG. 6, in which the timing of upshift instructions for the automatic transmission T is detected. The steps S33 through S37 of the control program and the calculation of starting speed of the fuel cut of FIG. 8 form control starting means 81, shown in FIG. 6, for starting the reduction control of the output of the engine 1. In such a reduction control, fuel injection from the fuel injection valve 11 is cut. The control starting means 81 starts the reduction control by detecting that the minus variation ratio δtrev of the turbine speed trev detected by the turbine speed sensor 67 forming speed monitoring means 84 is above the predetermined value δtrev1 after detecting the timing of the gear shift instruction by the gear shift instruction timing detecting means 80. Moreover, the steps S21, S22, S25 and S26 of the control program and the calculation of terminating speed of the gear shift of FIG. 10 form speed predicting means 82, in which the turbine speed (trevn+OTR) at the timing of the end of the fuel cut control is predicted, based on the turbine speed trevo at the time the variation ratio δtrev of the turbine speed trev is a zero or minus variation, by receiving the output of the turbine speed sensor 57. The speed predicting means 82 is constructed so that calculation of the terminating turbine speed trevn is inhibited by not proceeding to the steps following the step Sb1 until the inhibit times cti1, cti2, forming predetermined delay times, of the fuel cut control during gear shifts from 1-speed to 2-speed, from 2-speed to 3-speed, are minus values (cti1, cti2 is equal to or below 0) and have passed, at the step Sb0 of the flow of calculation of terminating speed of the gear shift of FIG. 10. Additionally, the steps S21, S22, S25 to S28 of the same control program comprise control terminating means 83 for terminating the fuel cut control at the timing at which the turbine speed trev becomes the speed (trevn+OTR) predicted by the speed predicting means 82 after detecting the timing of a gear shift instruction by the gear shift instruction detecting means 80.

Figure 11:
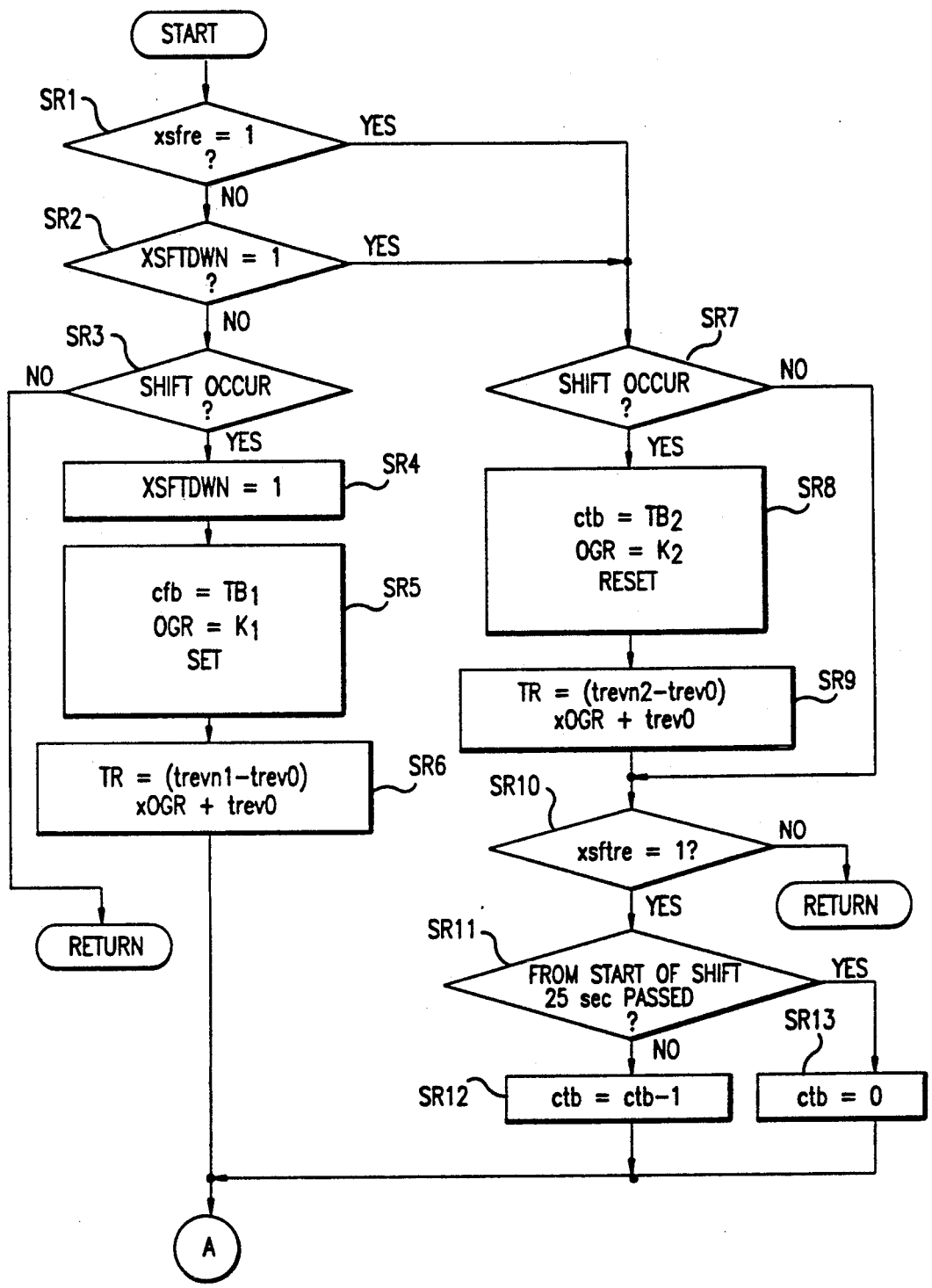
FIGS. 11 and 12 are flowcharts showing a retard control for ignition timing of a mixture during downshifting.
Figure 12:
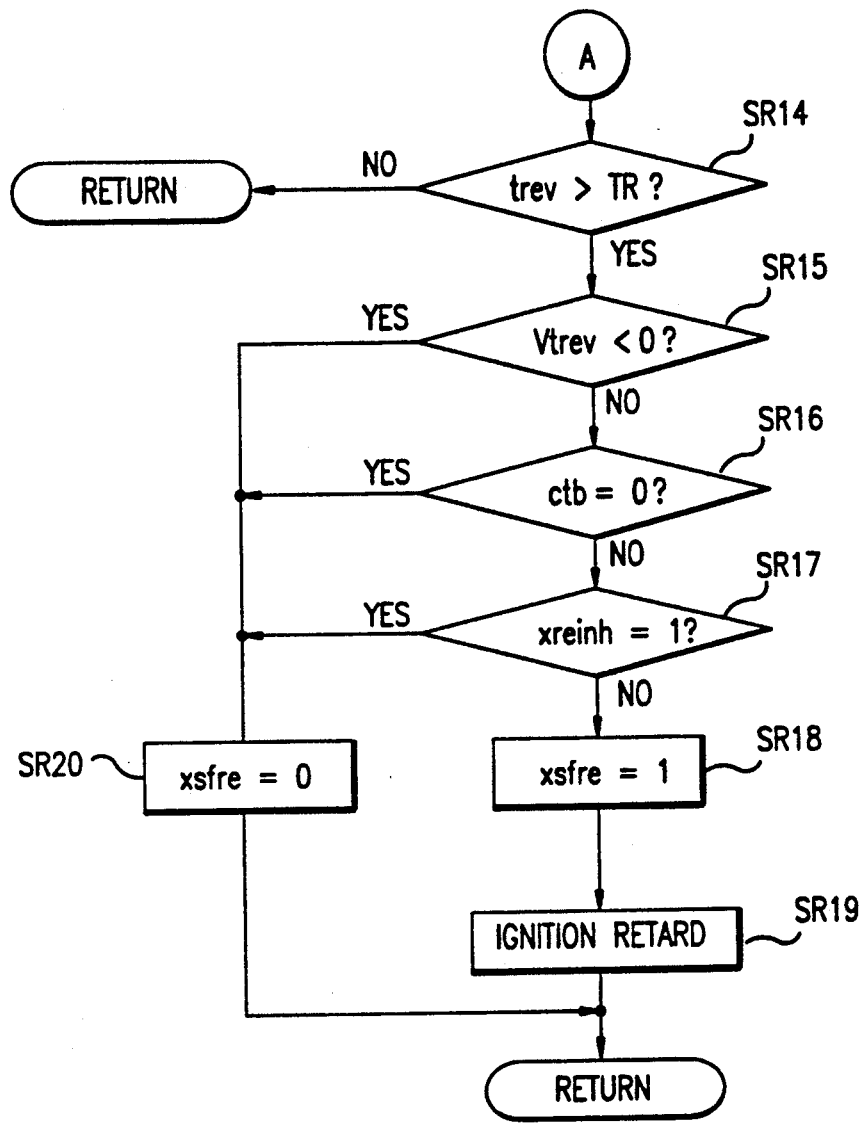

Moreover, the reduction control of the output of the engine 1 during downshifting is performed by a retard control of the ignition timing outlined in FIGS. 11 and 12. As shown in FIG. 11, a decision as to whether or not a retard flag xsfre of the ignition timing is equal to 1 is made in a step SR1. Also, a decision as to whether or not an in-shifting flag XSFTDWN is equal to 1 is made in a step SR2. At the beginning, since xsfre and XSFTDWN are commonly equal to 0, whether downshifting is occurring or not is determined at a step SR3. If downshifting is occurring, after the in-shifting flag XSFTDWN is set to 1 at a step SR4, the retard time ctb and a coefficient OGR of the ignition timing are set to 1 and k1, respectively, in accordance the kind of downshift, at a step SR5. Then, the turbine speed TR for starting a retard control of the ignition timing is calculated, from the following formula, at a step SR6.

$$TR = (trevn1 - trev0)*OGR + trevo$$

Here, trevn1 is a predicted turbine speed at a time gear shifting ends, and trevo is a turbine speed at a time at the start of gear shifting. The speed trevo is set by detecting a point at which the actual variation ratio is quickly shifted and comparing it against the variation ratio of the turbine speed trev at the timing of a gear shift instruction.

For example, in one particular control arrangement for one particular engine, a planned variation ratio is set to 84% upon a gear shift from the 4-speed gear to the 2-speed gear, to 100% upon a gear shift from the 4-speed gear to the 1-speed gear, to 75% upon a gear shift from the 3-speed gear to the 2-speed gear, to 87% upon a gear shift from the 3-speed gear to the 1-speed gear, and to 78% upon a gear shift from the 2-speed gear to the 1-speed gear. In another control apparatus for another engine, for all gear shifts, the planned variation ratio is set to 75%.

When the turbine speed trev is determined to be equal to or smaller than TR at a step SR14 shown in FIG. 12, a return to the main program represented in FIG. 11 is ordered, and the program goes from the step SR2 to step SR7. In step SR7, a decision is made as to whether or not a gear shift following the gear shifting mentioned above has occurred. If such a gear shift has occurred, the answer to the decision made in step SR7 is yes, and the retard time ctb and a coefficient OGR of the ignition timing are reset in step SR8 to TB2 and K2, respectively, in response to the kind of downshifting. Also, the turbine speed TR for starting a retard control of the ignition timing is calculated, in the manner described above, at a step SR9.

After this, a decision is made as to whether or not the flag xsffre, related to the retard control of the ignition timing, is equal to 1 at a step SR10 of FIG. 11. If the answer to the decision made in step SR10 is yes, a decision as to whether or not the time from the start of gear shifting has become greater than a predetermined time (i.e., 2.5 sec.) is made at a step SR11. If the predetermined time has not yet passed, the answer to the decision made in step SR11 is no, and the retard time ctb of the ignition timing is decreased by one increment at a step SR12. If the predetermined time has passed, the answer to the decision made in step SR11 is yes, and the retard time ctb is set to 0 at a step SR13.

After this, the program proceeds to step SR14, shown in FIG. 12. In step SR14, the turbine speed trev is compared with the turbine speed TR for starting the retard control of the ignition timing as mentioned above. If turbine speed trev is larger than TR, and if the answers to the decisions made in steps SR14 to SR17 are all no, then the retard flag xsfre of the ignition timing is eventually set to 1 at a step SR18. Subsequently, the retard control of the ignition timing is started at a step SR19.

After the retard control mentioned above is started, if the variation ratio vtrev of the turbine speed becomes a minus value (vtrev is smaller than 0), the answer to a decision made at a step SR15 is yes, and the retard flag xsfre of the ignition timing is set to 0 in a step SR20.

Consequently, the retard control of the ignition timing is stopped, and a return is performed.

Figure 14:
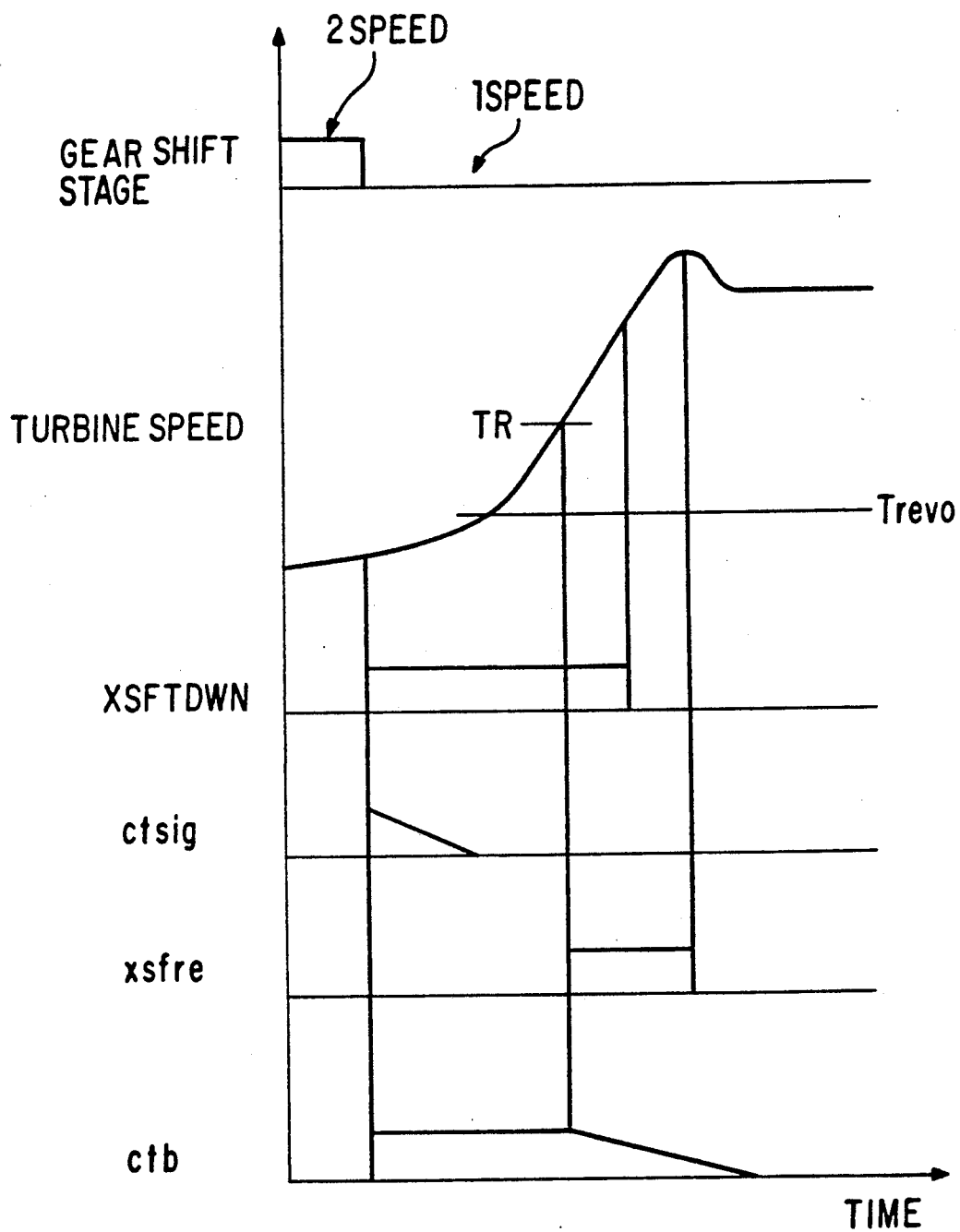
FIG. 14 is a timing chart showing the retard control during downshifting in accordance with the control of FIGS. 11 and 12.

Moreover, even if it is not determined that the variation ratio vtrev of the turbine speed has become a minus value, and the answer to the decision made in step SR15 is no, if the retard time ctb of the ignition timing is determined to be equal to 0, and the answer to a decision made at a step SR16 is yes, or if the retard inhibit condition flag xreinh is determined to be equal to 0, and the answer to a decision made at a step SR17 is yes, the retard flag xsfre is set to 0 at a step SR20, and the retard control of the ignition timing is stopped. Return is then performed. The retard control of the ignition timing during this downshifting is shown in FIG. 14.

In the embodiment mentioned above, as shown in FIG. 13, during upshifting from the 1-speed gear to the 2-speed gear, if a gear shift instruction occurs at a time represented by a point A shown in the drawing, and the opening degree of the throttle valve is equal to or above 6/8, the four-cylinder cut condition completion flag xfcen4 is set to 1 at this timing, and the inhibit time cti1 of the fuel cut control for gear shifting from the 1-speed gear to the 2-speed gear is set and started to decrease.

At a time represented by a point B shown in FIG. 13, the variation ratio δtrev of the turbine speed is equal to or below 0. The terminating turbine speed trevn of the gear shift is then predicted. On the basis of this, the terminating speed (trevn+OTR) of the fuel cut control is calculated. Accordingly, since the terminating speed (trevn+OTR) is calculated at stages right before or right after the turbine speed trev changes and drops largely as mentioned above, the terminating speed of the fuel cut control is precisely predicted, notwithstanding a variation of the turbine speed.

Figure 13:
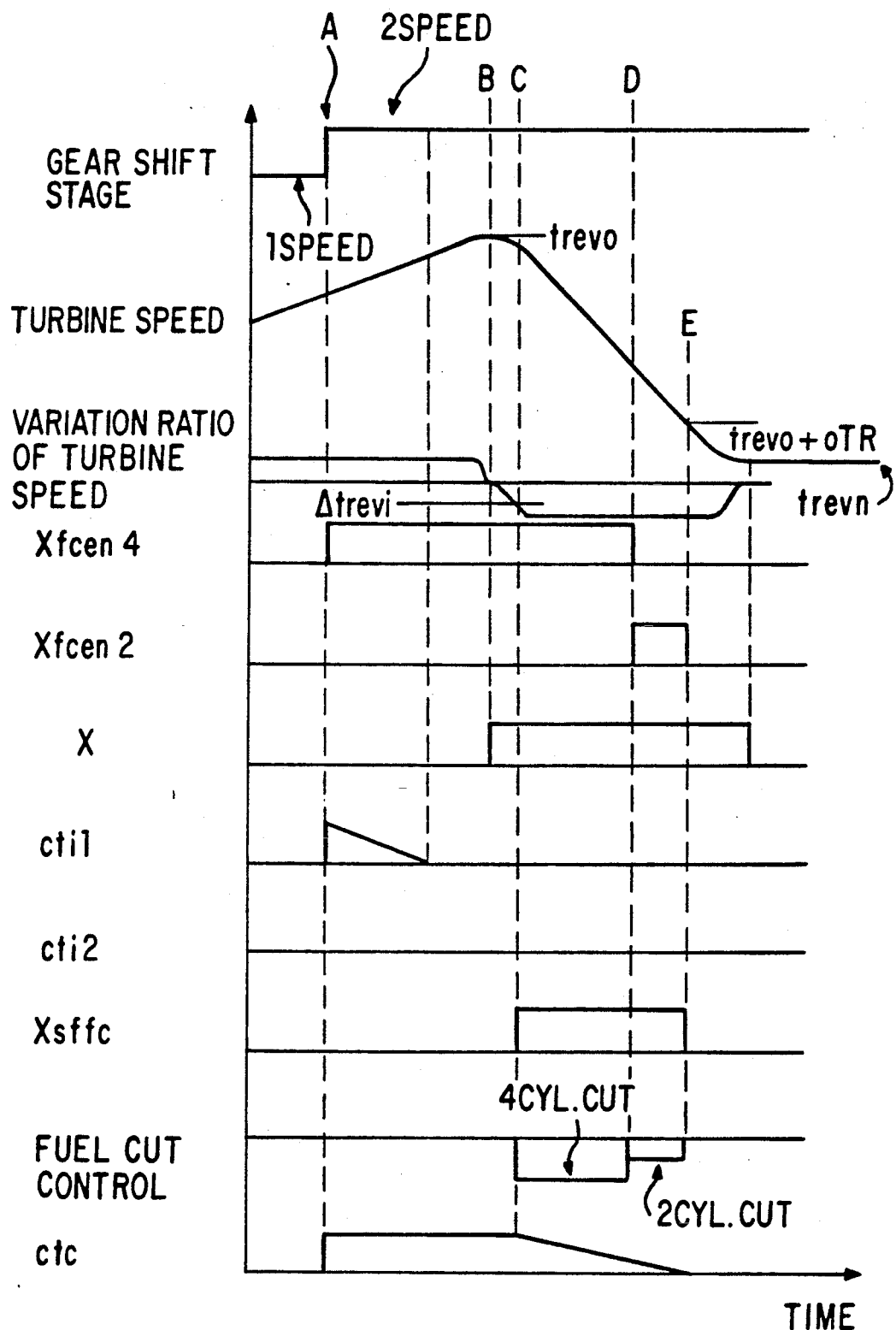
FIG. 13 is a timing chart showing the fuel cut control during upshifting in accordance with the control of FIGS. 7 and 8.

At a timing represented by a point C shown in FIG. 13, the variation ratio δtrev of the turbine speed is equal to the predetermined value δrev1 (i.e., −50 r.p.m.). The fuel in-cutting flag xsffc is set to 1, and the fuel cut control for all four engine cylinders starts. Since the fuel cut control is executed only during gear shifting as mentioned above, malfunctions caused by having the fuel cut control operate at times other than during gear shifting are surely prevented.

After this, at a timing represented by a point D shown in FIG. 13, the turbine speed trev is identified as the terminating speed (trevn+OTR) of the fuel cut control mentioned above. Then, the four-cylinder cut condition completion flag xfcen4 is set to 0, and the two-cylinder cut condition completion flag xfcen2 is set to 1. At this timing, the fuel cut control is performed on only two-cylinders, and the terminating speed (trevn+OTR) of the fuel cut control is calculated in the same manner as mentioned above.

Then, at a timing represented by a point E shown in FIG. 13, the turbine speed trev is identified as the terminating speed (trevn+OTR) of the fuel cut control mentioned above, the fuel in cutting flag xsffc is set to 1, and the fuel cut control performed on the two-cylinders is terminated. Here, since the terminating speed (trevn+OTR) of the fuel cut control has been calculated precisely as mentioned above, termination of the fuel cut control is precisely performed.

Additionally, since the calculation of the terminating speed trevn of the gear shift is started at the timing B, after which the inhibit times cti1, cti2 of the fuel cut control during gear shift from the 1-speed gear to the 2-speed gear and from the 2-speed gear to the 3-speed gear become zero or negative values (cti1 is equal to or below 0, cti2 is equal to or below 0), respectively, the calculation of the terminating speed trevn of the gear shift is done without error.

Hereinafter, according to a flowchart shown in FIG. 15, and referring to FIGS. 1 through 4, a control method for torque reduction control during gear shifting will be explained, using, as an example, a downshift from the 3-speed gear to the 2-speed gear associated with the 3-4 clutch 44 having the drift on ball 79. In the downshift from the 3-speed gear to the 2-speed gear, the 2-4 brake is on and the 3-4 clutch 44 and the coast clutch 43 are off.

The same torque reduction control during gear shifting is performed during other kinds of gear shifts.

This torque reduction control during gear shifting has a control logic in which the torque reduction of the engine 1 is performed by retarding the ignition timing only for a constant time TRT. The time TRT lasts from a time at which a difference between the turbine speed trev of gear shifting and the turbine speed $trev_0$ at the start of a gear shift and a difference between a predicted turbine speed ($trev_0$/ei) at the end of gear shifting and the turbine speed $trev_0$ at the start of a gear shift reach a predetermined ratio OTR (hereinafter called a retard start coefficient). The torque reduction is also performed depending on whether or not the turbine speed $trev_0$ at the start of a gear shift is equal to or above a predetermined value TREV1, the retard start coefficient OTR is switched (OTR1, OTR2), and a terminating timing of the torque reduction (retard of the ignition) is identified with a terminating timing of gear shift operation, so that the timing of the torque reduction is normalized.

Moreover, in lieu of torque reduction by retarding the ignition timing, it is possible to perform torque reduction by either reduction of the volume of fuel injection or fuel cut control.

At the start of the control, a decision as to whether or not a substantial gear shift (down shift) from the 3-speed gear to the 2-speed gear has occurred is made. Here, whether the gear shift has occurred or not is judged by whether the variation ratio (differential value) of the turbine speed trev has reached a value of 1.5 times the variation ratio of the turbine speed at the time at which a gear shift instruction signal is output from the transmission control unit 58. Moreover, the turbine speed trev, the variation ratio of the turbine speed, and so on, are determined by using information from the engine control unit 57 and the transmission control unit 58.

Figure 15:
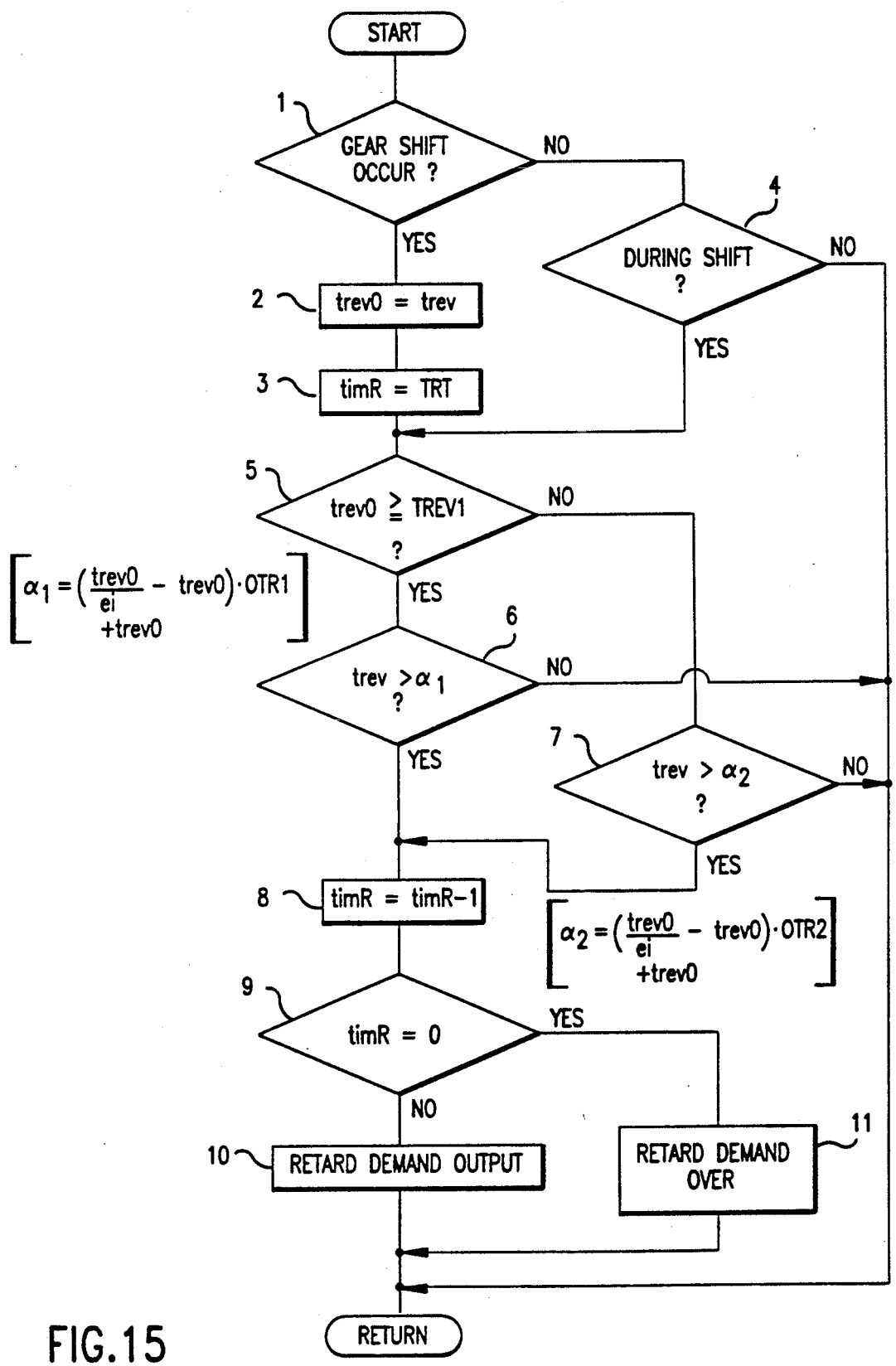
FIGS. 15 to 18 are flowcharts showing retard control steps during shifting.

If a gear shift is not occurring, the answer to a decision made in step #1 outlined in FIG. 15 is judged to be (NO). Furthermore, at a step #4, a determination is made as to whether or not gear shifting was already taking place. If it is determined that gear shifting is already taking place and the answer to the decision made in step #4 is (YES), a skip to a step #5, which will be explained later, is performed. If it is not determined that gear shifting is already taking place and the answer to the decision made in step #4 is (NO), a return to step #1 is performed, because it is unnecessary to perform torque reduction.

On the other hand, if it is judged that a gear shift is occurring, the answer to the decision made at step #1 is judged to be (YES), and, at step #2, the turbine speed trev at the present timing is memorized as the turbine speed $trev_0$ at the time at which gear shifting begins.

At a step #3, an initial value TRT is provided to a retard timer timR. The retard timer timR is a timer for torque reduction (retarding of the ignition timing) so that torque reduction is done only for the set time TRT.

Next, at a step #5, a decision is made as to whether or not the turbine speed $trev_0$, at the time gear shifting starts, is equal to or above a set value TREV1. The set value TREV1 is set to a predetermined value on the boundary between a high speed region, at which the required time for a gear shift is relatively long, and a low speed region, at which the required time for gear shift is relatively short. Since centrifugal force exerted on the 3-4 clutch 44 (the hydraulic piston 74) becomes strong at high speeds, under its influence, release of the pressure leak passage 78 by the drift on ball 79 is delayed.

Figure 19:
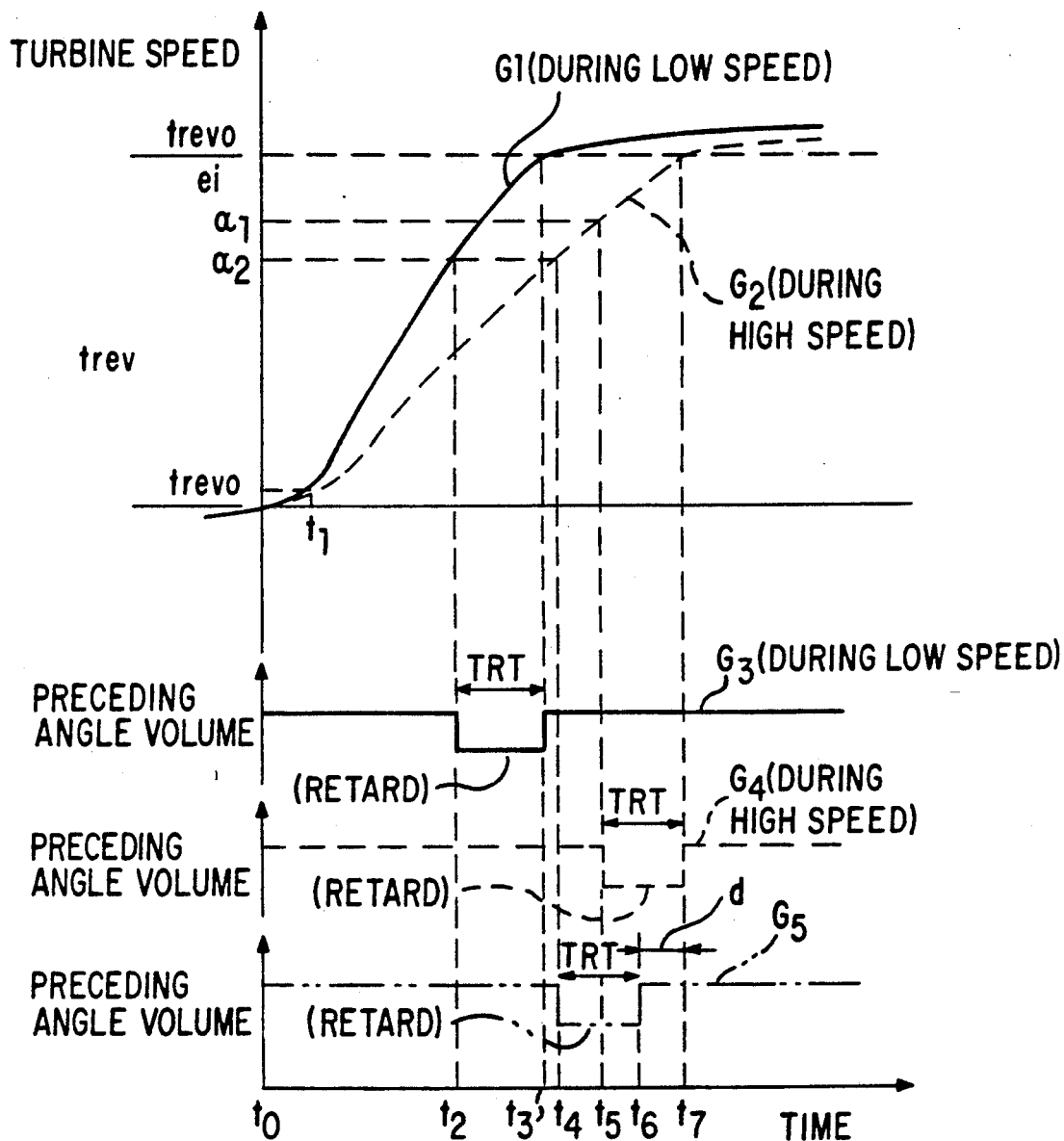
FIG. 19 is a timing chart showing the retard control during shifting in accordance with the control of FIG. 15.

Therefore, as shown in FIG. 19, when the gear shift instruction signal is output at a timing $t_0$ and the gear shift is substantially started at a timing $t_1$, the required time ($t_1$ to $t_7$) for the gear shift at a high speed ($G_2$) is longer than the required time ($t_1$ to $t_3$) for the gear shift at a low speed ($G_1$). Accordingly, if the retard start coefficient OTR, used to determine the starting timing of the torque reduction, is set so that the terminating timing of the torque reduction is identified with the timing $t_3$ of the end of the gear shift at a low speed, a period of torque reduction is from $t_4$ to $t_6$ during a high speed, and the terminating timing $t_6$ of the torque reduction is earlier than the timing of the end of the gear shift $t_7$ by a period d. Consequently, shocks during gear shifts are not prevented effectively. Otherwise, if the retard start coefficient OTR is set so as to be appropriate for a high speed, the torque reduction is continued after the timing $t_3$ of the end of the gear shift during a low speed. Increases in rotation speeds of the engine may be inefficient.

Therefore, in this embodiment, during a high speed, the retard start coefficient OTR is set to a predetermined value OTR1, so that the terminating timing of the torque reduction is identified with the timing at the end of the gear shift ($G_4$), by starting the torque reduction from timing $t_5$. Moreover, at a low speed, the retard start coefficient OTR is set to a predetermined value OTR2, so that the terminating timing of the torque reduction is identified with the timing of the end of the gear shift ($G_3$), by starting the torque reduction from timing $t_3$.

If the turbine speed $trev_0$ at the time a gear shift starts is equal to or above TREV1, the answer to a decision made at step #5 is judged (YES). Then, whether or not the turbine speed trev exceeds a retard starting speed $\alpha_1$ during a high speed, as determined by the following Formula 1, is judged at a step #6.

$$\alpha_1 = (trev_0/ei - trev_0) * OTR1 + trev_0 \qquad \text{Formula 1}$$

In Formula 1, ei is a gear ratio, and OTR1 is a retard start coefficient during high speed.

At the step #6, a judgment is made as to whether or not the difference between the turbine speed trev of gear shifting and the turbine speed $trev_0$, the start of a gear shift, against the difference between a predicted turbine speed at the end of gear shifting and the turbine speed $trev_0$ at the start of the gear shift, has reached a predetermined ratio OTR1.

If it is determined that the turbine speed trev is equal to or below $\alpha_1$, the answer to the decision made in step #6 is judged (NO), since the turbine speed trev has not yet reached the speed $\alpha_1$ to start the torque reduction. A return to the step #1 is then performed.

If it is determined that the turbine speed trev is above $\alpha_1$, the answer to the decision made is step #6 is judged (YES), since the turbine speed trev has reached the speed $\alpha_1$ to start the torque reduction. The torque reduction of the engine 1 by retarding the ignition timing is performed only for the predetermined time TRT.

More specifically, first, the retard timer timR is decreased by 1 at a step #8. Then, a decision as to whether the retard timer timR is equal to 0 or not, namely, whether the time for the torque reduction has reached the predetermined time TRT or not, is made at a step #9.

If the retard timer timR is not determined to be equal to 0 and the answer to the decision made at step #9 is (NO), since the predetermined time TRT has not yet passed, the ignition timing is retarded at a step #10, and the torque reduction is continued. On the other hand, if the retard timer timR is equal to 0 and the answer to the decision made at step #9 is (YES), since the predetermined time TRT has passed after starting the torque reduction, retarding of the ignition timing is stopped at a step #11, so that the torque reduction is terminated. After this, a return to the step #1 is performed.

Meanwhile, at the step #5 mentioned above, if the turbine speed $trev_0$ at the gear shifting starts is below TREV1, the answer to the decision made in step #5 is judged (NO). Then, at a step #7, a decision as to whether or not the turbine speed trev exceeds a retard starting speed $\alpha_2$ during a low speed, as indicated following Formula 2, is made.

$$\alpha_2 = (trev_0/ei - trev_0) * OTR2 + trev_0 \qquad \text{Formula 2}$$

In Formula 2, ei is a gear ratio, and OTR2 is a retard start coefficient for low speed.

At the step #7, a judgment is made as to whether or not the difference between the turbine speed trev of gear shifting and the turbine speed $trev_0$ at the start of a gear shift, against the difference between a predicted turbine speed at the end of gear shifting and the turbine speed $trev_0$ at the start of a gear shift, has reached a predetermined ratio OTR2.

If the turbine speed trev is equal to or below $\alpha_2$ and the answer to the decision made in step #7 is judged (NO), since the turbine speed trev has not yet reached the speed $\alpha_2$ to start the torque reduction, a return to the step #1 is performed.

On the other hand, if the turbine speed trev is above $\alpha_2$, the answer to the decision made in step #7 is judged (YES). Since the turbine speed trev has reached the speed $\alpha_2$ to start the torque reduction, the steps #8 to #11 are executed in the same manner as during high speed operation.

Thus, the terminating timing of the torque reduction is identified with the timing of the end of the gear shift during both high and low speeds, so that the timing of the torque reduction is normalized and shocks from gear shifting are effectively prevented.

Hereinafter, another control apparatus will be explained. In this control apparatus, the hardware used is similar to that used in the embodiment described above. Differences between the methods of torque reduction control during gear shifting are slight. Therefore, to avoid a duplicate explanation, only the differences between the control apparatuses which relate to the torque reduction control during a gear shift will be explained.

Figure 16:
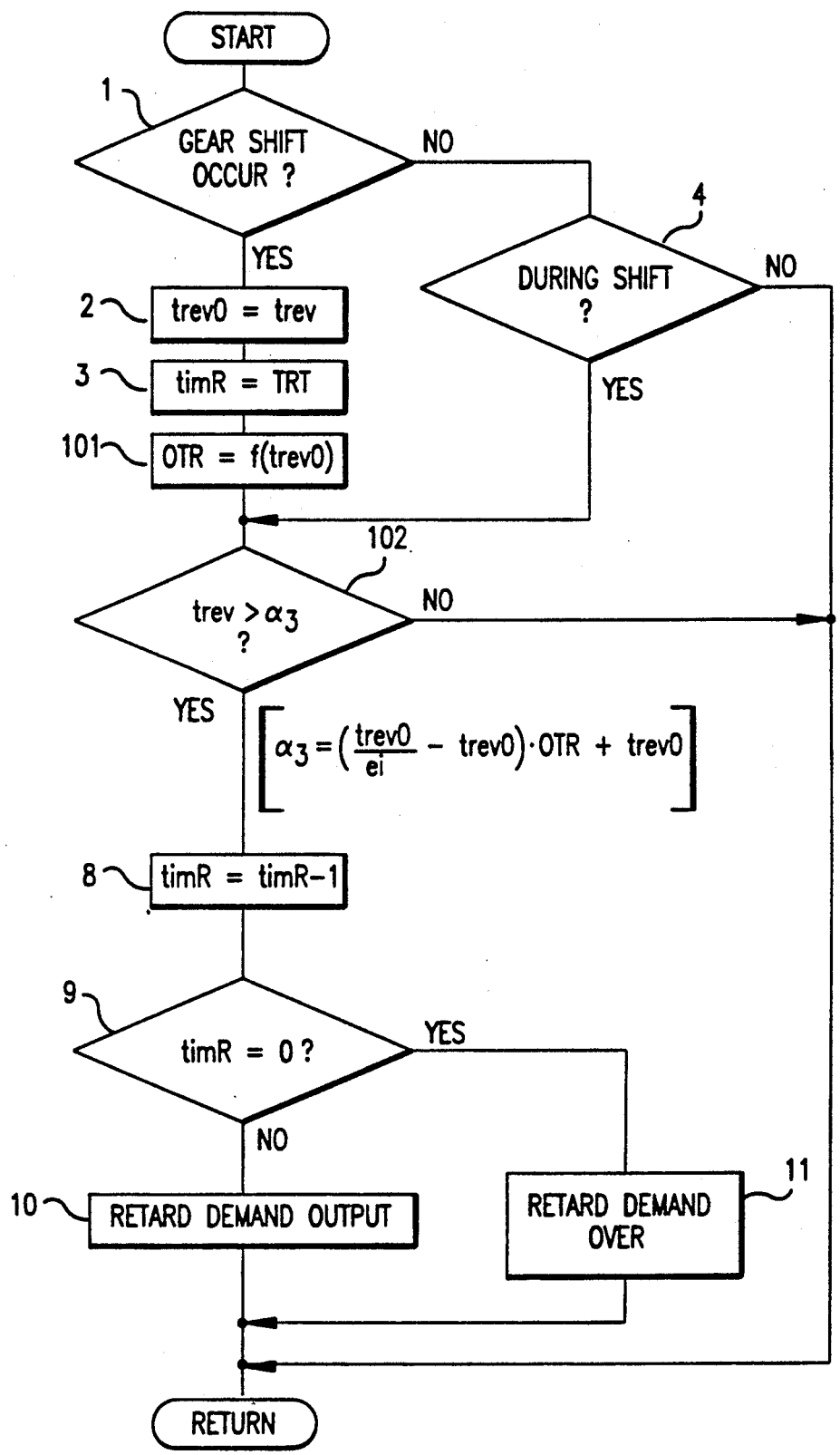

In this control apparatus, the torque reduction control during a gear shift is performed according to a flowchart shown in FIG. 16. If a step in the flowchart shown in FIG. 16 has the same function as a step of the flowchart shown in FIG. 15, the step in FIG. 16 is given the same step reference number.

In this control apparatus, steps #102, #103 are provided in lieu of the steps #5, #6, #7 mentioned above.

At the step #101, the retard start coefficient ORT is set using a predetermined function f in response to the turbine speed $trev_0$ at the start of a gear shift.

Next, at the step #102, a decision is made as to whether or not the turbine speed trev exceeds a retard starting speed $a_3$, as determined by the following Formula 3.

$$a_3 = (trev_0/ei - trev_0) * OTR + trev_0 \quad \text{Formula 3}$$

Moreover, in Formula 3, ei is a gear ratio.

At the step #102, a decision is made as to whether or not the difference between the turbine speed trev of gear shifting and the turbine speed $trev_0$ at the start of a gear shift, against the difference between a predicted turbine speed at the end of gear shifting and the turbine speed $trev_0$ at the starting of the gear shift, has reached a predetermined ratio OTR.

In this control apparatus, the starting timing of the torque reduction (the retard of the ignition timing) is sequentially changed in response to the turbine speed $trev_0$ at the start a gear shift. Consequently, the termination timing of the torque reduction is identified with the time at the end of the gear shift. It is natural that an effect which is similar to that of the control apparatus mentioned above is obtained in this control apparatus.

Hereinafter, another control apparatus will be explained. In this control apparatus, the hardware used is similar to, but the method of torque reduction control during gear shifting is different from, hardware used in and the control method of the embodiment mentioned above. Therefore, to avoid a duplicate explanation, only the control method for the torque reduction control during a gear shift will be explained according to a flowchart shown in FIG. 17.

This control apparatus basically has a control logic by which the torque reduction of the engine 1 is performed by retarding the ignition timing only for a predetermined time TRT. The predetermined time TRT lasts from a time at which a difference between the turbine speed trev of gear shifting and the turbine speed $trev_0$ at the start of a gear shift and a difference between a predicted turbine speed ($trev_0/ei$) at the end of gear shifting and the turbine speed $trev_0$ the start of a gear shift reach the retard start coefficient OTR. The torque reduction is also performed depending on whether the turbine speed $trev_0$ at the start of a gear shift is equal to or above a predetermined value TREV1 or not and the predetermined time TRT is switched (TRT1, TRT2), and by changing the period of the torque reduction so that a termination timing of the torque reduction (retard of the ignition) is identified with a terminating timing of gear shift operation, so that the timing of the torque reduction is normalized.

At a step #21, a decision is made as to whether or not a substantial gear shift from the 3-speed gear to the 2-speed gear has occurred. The method of judgement of the occurrence of the gear shift is the same as that of the control apparatus mentioned above.

If a gear shift is not occurring and the answer to the decision made in step #21 is judged to be (NO), then, at a step #26, a determination is made as to whether or not gear shifting is already taking place. Then, if gear shifting is taking place and the answer to the determination made in step #26 is judged to be (YES), the program skips to a step #27, which will be explained later. If the answer to the determination made in step #26 is (NO), a return to the step #21 is performed.

On the other hand, if it is judged that a gear shift is occurring, the answer to the decision made at step #21 is judged to be (YES), and the turbine speed trev is memorized as the turbine speed $trev_0$ at the start of a gear shift at a step #22.

At a step #23, a decision is made as to whether or not the turbine speed $trev_0$, at the time a gear shift starts, is equal to or above a set value TREV1 is made.

If the turbine speed $trev_0$ at the start of a gear shift is equal to or above TREV1, the answer to the decision made at step #23 is judged to be (YES). Then, at step #24, an initial value TRT1 for high speed is provided to the retard timer timR at a step #24. If the turbine speed $trev_0$ at the start of a gear shift is below TREV1, the answer to the decision made at step #23 is judged to be (NO). Then, at step #25, an initial value TRT2 for low speed is set to the retard timer timR.

Next, at the step #27, a decision is made as to whether or not the turbine speed trev exceeds a retard starting speed $a$ as determined by the following Formula 4.

$$a = (trev_0/ei - trev_0) * OTR + trev_0 \quad \text{Formula 4}$$

In Formula 4, ei is a gear ratio, and OTR is the retard start coefficient.

At the step #27, a decision is made as to whether or not the difference between the turbine speed trev of gear shifting and the turbine speed $trev_0$ the starting of a gear shift, against the difference between a predicted turbine speed at the end of a gear shifting and the turbine speed $trev_0$ at the start of a gear shift, has reached a predetermined ratio OTR.

If the turbine speed trev is equal to or below $a$, the answer to the decision made at step #27 is judged to be (NO). Since the turbine speed trev has not yet reached the speed $a$ to start the torque reduction, a return to the step #21 is performed.

On the other hand, if the turbine speed trev is above $a$, the answer to the decision made at step #27 is judged to be (YES). Since the turbine speed trev has reached the speed $a$ to start torque reduction, torque reduction by retarding of the ignition timing is performed while the retard timer timR counts out time (TRT1 or TRT2).

More specifically, first, the retard timer timR is decreased by 1 at a step #28. Then, a decision as to whether or not the retard timer timR is equal to 0, namely, whether the time for the torque reduction has reached the set value of either TRT1 (during high speed) or TRT2 (during low speed) is made at a step #29.

If the retard timer timR is not equal to 0, the answer to the decision made at step #29 is judged to be (NO). Since neither of the predetermined times TRT1 and TRT2 has yet passed, the ignition timing is retarded at a step #30, and torque reduction is continued. On the other hand, if the retard timer timR is equal to 0, the answer to the decision made at step #29 is (YES). Since the predetermined time, i.e., either TRT1 or TRT2, after the start of the torque reduction has passed, retarding of the ignition timing is stopped at a step #31, so that the torque reduction is terminated. After this, a return to the step #21 is performed.

Figure 20:
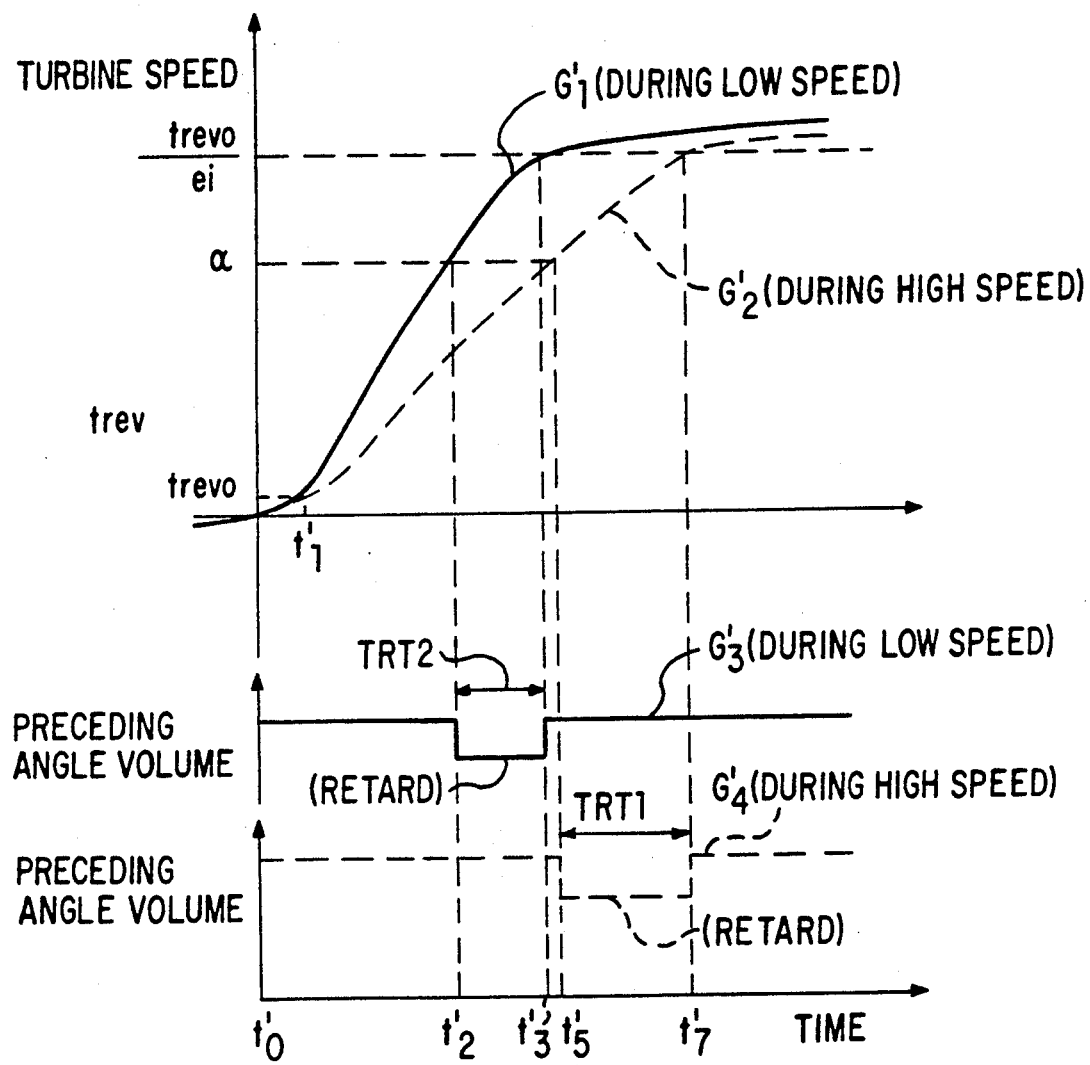
FIG. 20 is a timing chart showing the retard control during shifting in accordance with the control of FIG. 17.

In this control apparatus, as shown in FIG. 20, when the gear shift instruction signal is output at a timing $t_{0'}$ and gear shifting is substantially started at a timing $t_{1'}$, during low speed ($G_{1'}$, $G_{3'}$), period $t_{2'}$ to $t_{3'}$ of the torque reduction (the retard of the ignition timing) is set relatively short, and the timing of the torque reduction is identified with the timing of the end of the gear shift. Moreover, during high speed ($G_{2'}$, $G_{4'}$), period $t_{5'}$ to $t_{7'}$ of the torque reduction is set relatively long, and the timing of the torque reduction is identified to the timing of the end of the gear shift. Accordingly, the timing of the torque reduction is normalized and shocks from the gear shift are effectively prevented.

Hereinafter, another control apparatus will be explained. In this control apparatus, the hardware used is similar to, but the method of torque reduction control during gear shifting is different from, the hardware used by and the control method of the control apparatus mentioned most recently above. Therefore, to avoid a duplicate explanation, only the differences between the last control apparatus mentioned above and the presently described apparatus, which relate to the torque reduction control during a gear shift, will be explained.

Figure 17:
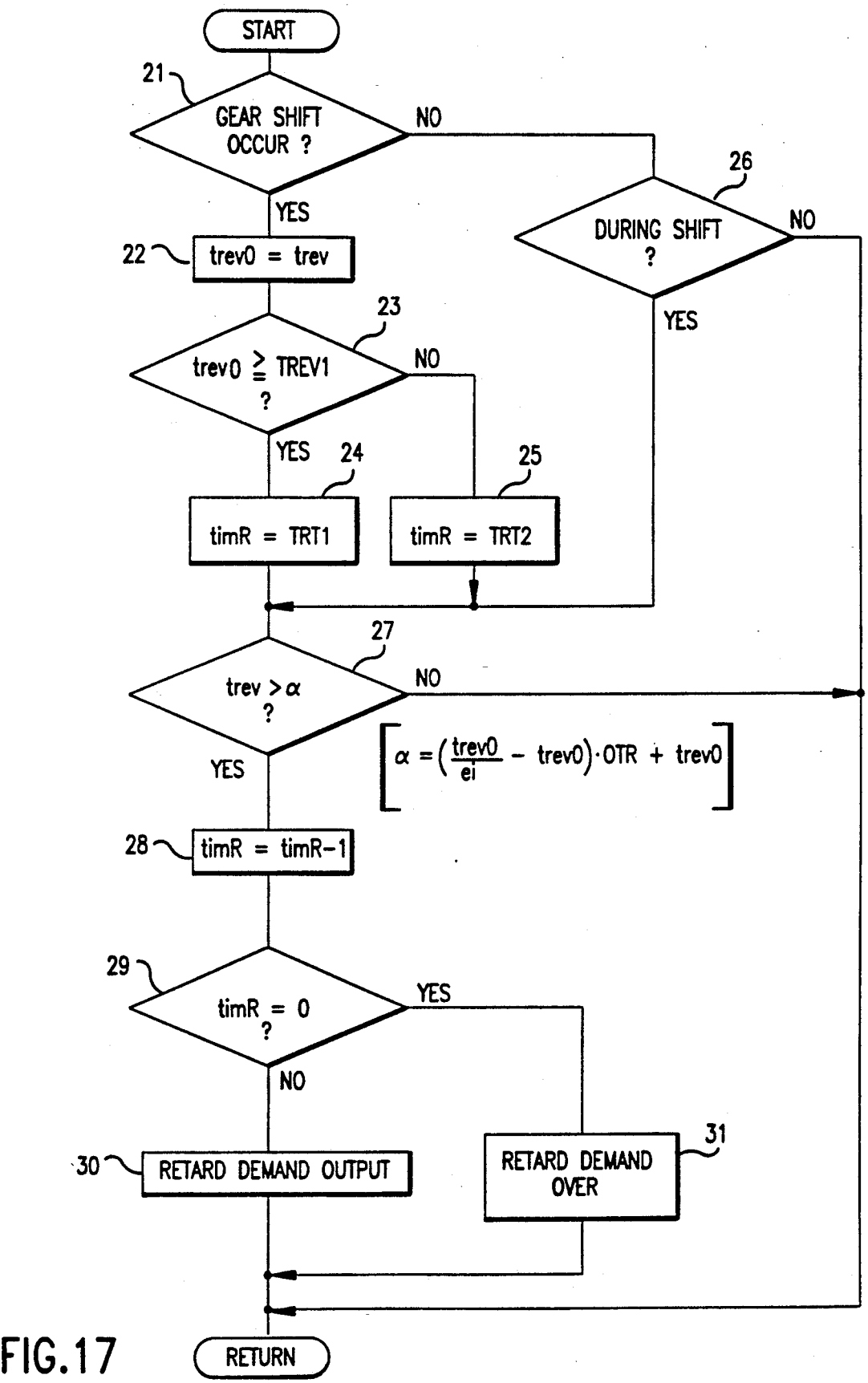
Figure 18:
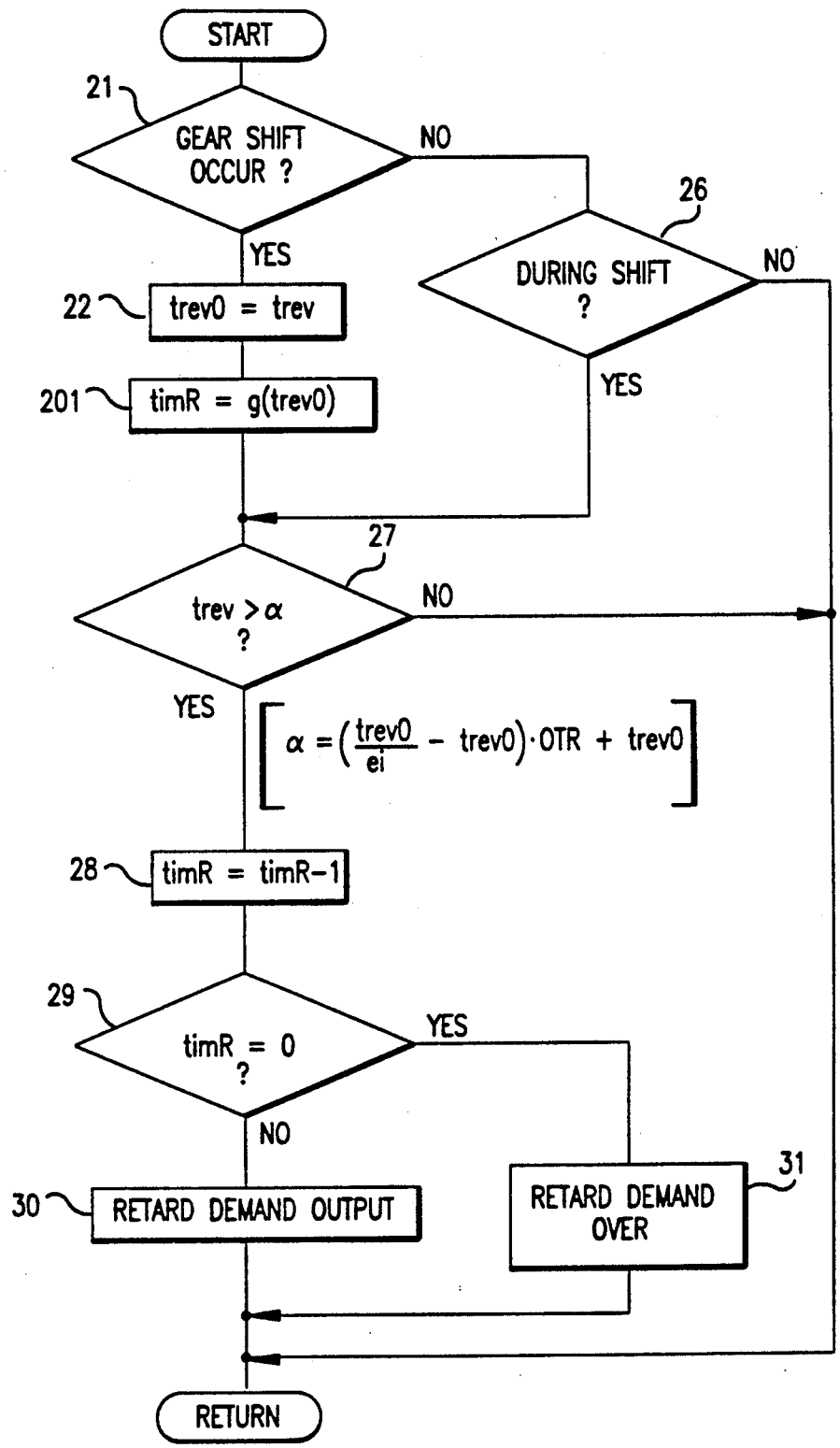

In this control apparatus, the torque reduction control during a gear shift is performed according to a flowchart shown in FIG. 18. If a step in the flowchart shown in FIG. 18 has the same function as a step in the flowchart shown in FIG. 17, the step in FIG. 18 is given the same step reference number.

In this control apparatus, steps #201 are provided in lieu of the steps #23, #24, #25 of the flowchart shown FIG. 17.

At the step #201, an initial value of the retard timer timR, namely, a period of the torque reduction, is set using a predetermined function g in response to the turbine speed $trev_0$ at the start of a gear shift.

Accordingly, in this control apparatus, the period of torque reduction (the retardation of the ignition timing) is sequentially changed in response to the turbine speed $trev_0$ at the start of a gear shift, so that the termination timing of the torque reduction is identified with the timing of the end of the gear shift. It is natural that an effect which is similar to that of the control apparatus mentioned above is obtained in this control apparatus.

Hereinafter, according to FIGS. 21 and 22, and referring to FIGS. 1, 2, 3, and 5, the method of the torque reduction control will be explained using a downshift from the 4-speed gear to the 3-speed gear. Moreover, since such a torque reduction control is performed during all kinds of gear shifting, control routines for the torque reduction control are individually provided for every upshift and downshift, but are not shown.

Figure 21:
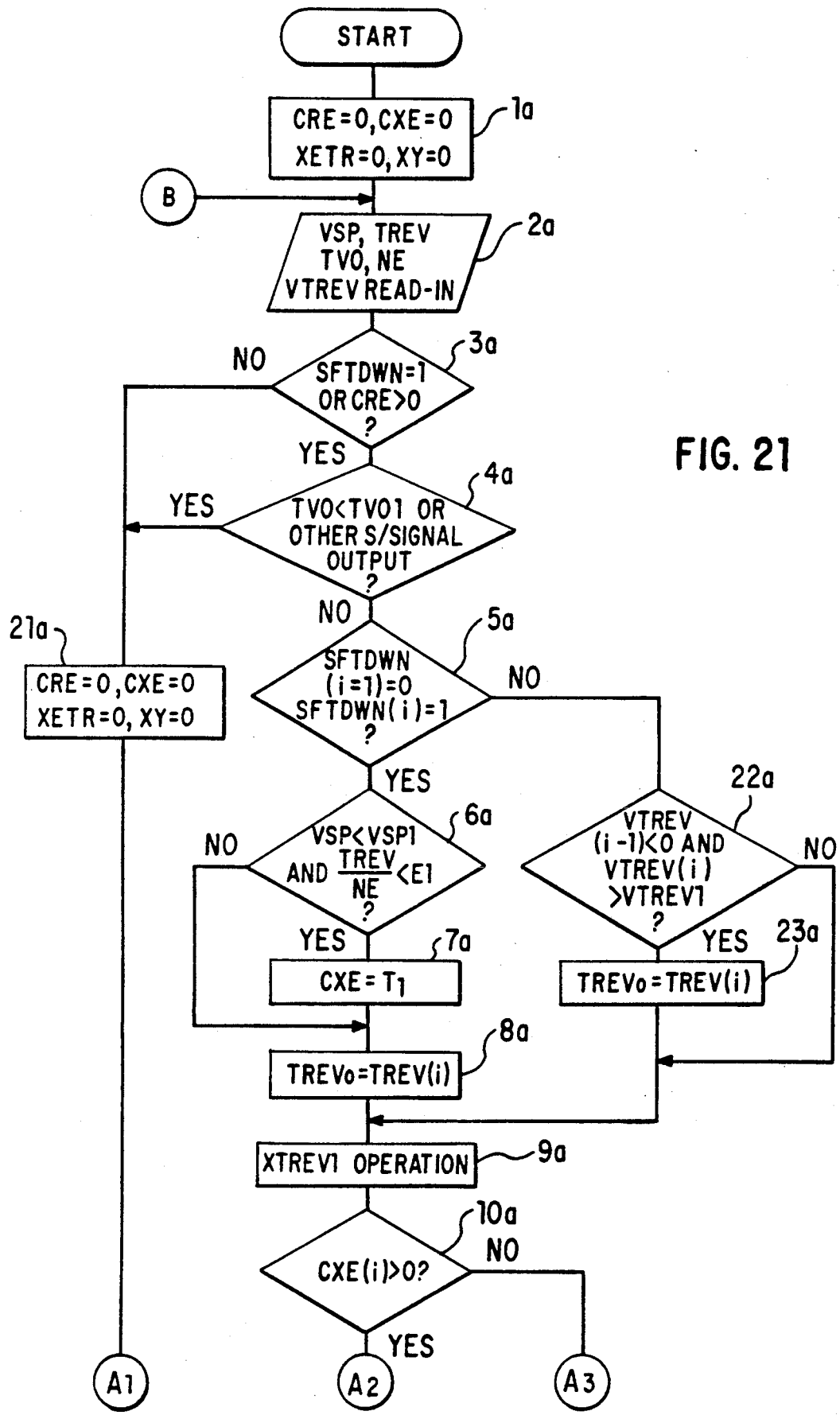
FIGS. 21 and 22 are flowcharts showing another retard control based on an input torque of a transmission gear mechanism during shifting in accordance with a preferred embodiment of the present invention.
Figure 22:
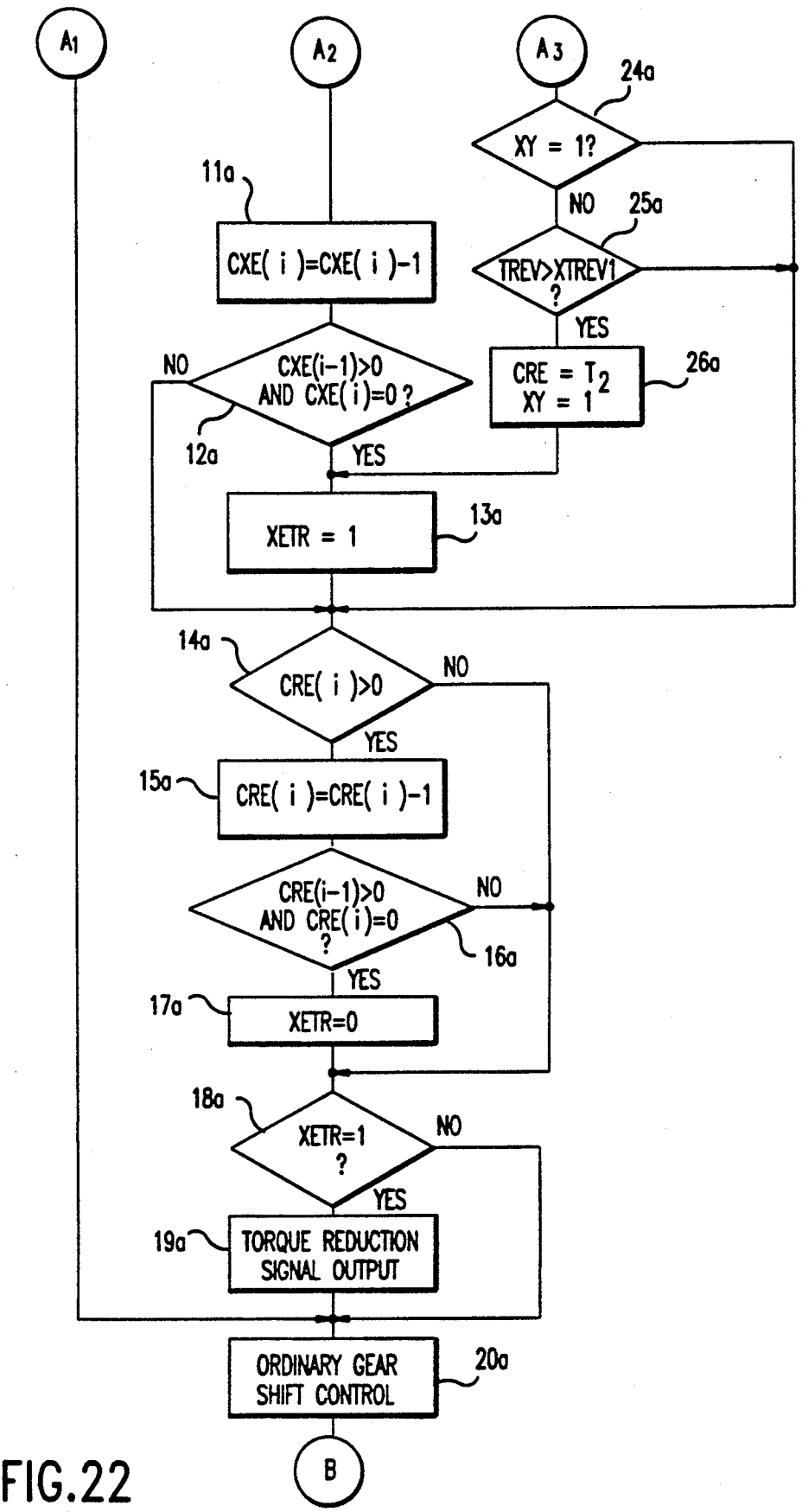

Meanings of each sign used in flowcharts of FIG. 21 and 22 are described in the following.

(1) NE: engine speed detected by the engine speed sensor 61;
(2) TVO: opening degree of the throttle as detected by the throttle opening degree sensor 65;
(3) TREV: turbine speed detected by the turbine speed sensor 67;
(4) VSP: vehicle speed detected by the vehicle speed sensor 68;
(5) VTREV: variation ratio of the turbine speed obtained by the differential of the turbine speed TREV with respect to time;
(6) CXE: torque reduction inhibit timer to delay a start of the torque reduction only for a predetermined time during downshift;
(7) CRE: torque reduction terminating timer to decide a termination timing of the torque reduction;
(8) XETR: torque reduction flag, for performing the torque reduction by retarding the ignition timing when its valve is 1;
(9) XY: switching flag, for skipping step #25, #26, #13 when its value is 1;
(10) SFTDWN: downshift flag, which has a valve of 1 when the driving condition is such that a downshift from the 4-speed gear to the 3-speed gear should be performed;
(11) XTREV1: torque reduction starting turbine speed; and
(12) TREVn: predicted turbine speed after downshift;

If the control starts, first, the torque reduction terminating timer CRE, torque reduction inhibit timer CXE, torque reduction flag XETR and switching flag XY are initialized at a step #1a (all are set to 0).

At a step #2a, the vehicle speed VSP, the turbine speed TREV, the opening degree of the throttle valve TVO, the engine speed NE, and the variation ratio of the turbine speed VTREV are read in.

Figure 5:
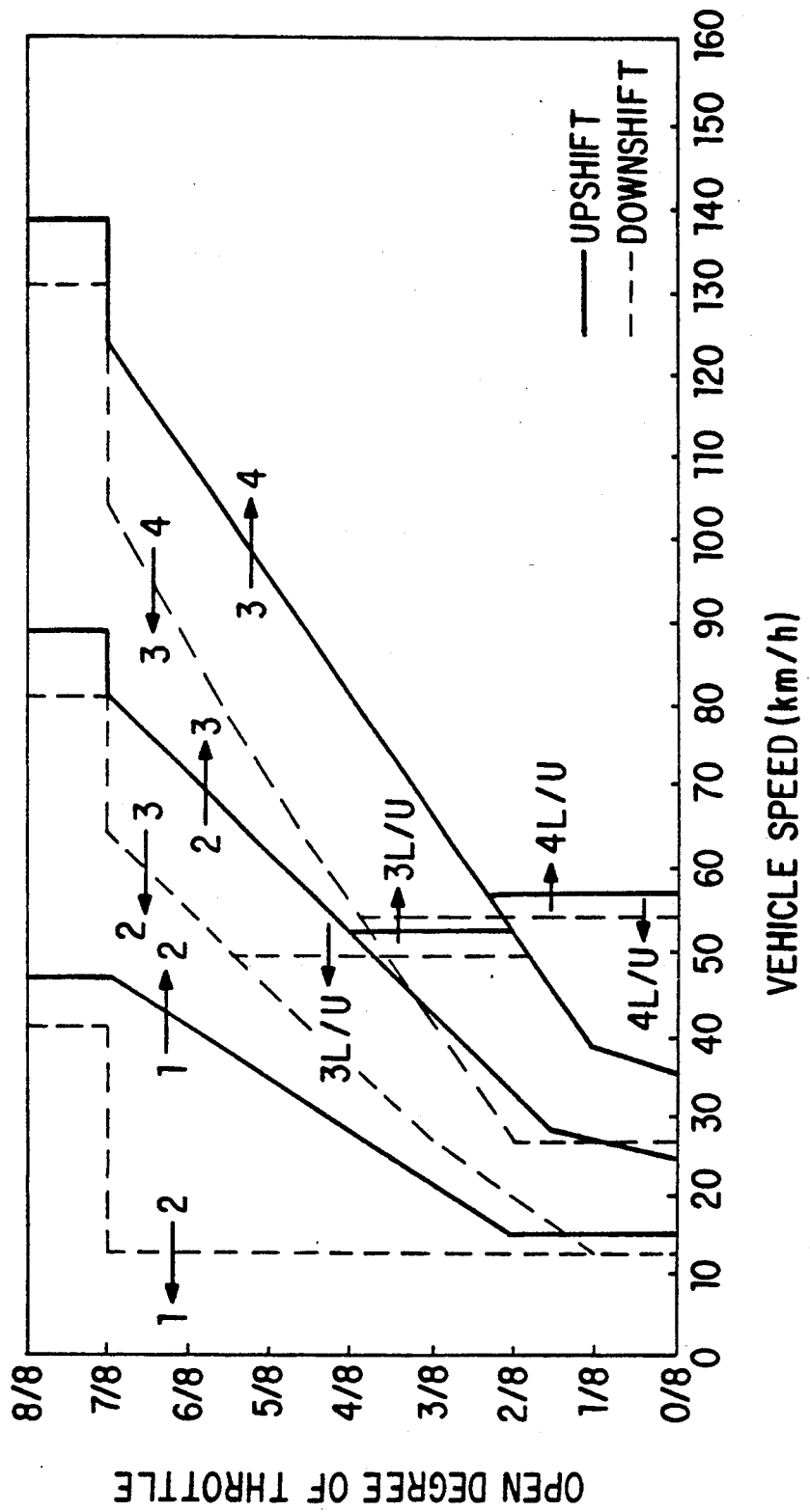
FIG. 5 is a map showing a distribution of gear shifts in conjunction with speed of the automotive vehicle and degree of opening of a throttle valve of the automatic transmission of FIG. 1.

At a step #3a, it is determined whether or not the downshift flag SFTDWN is at 1 or the torque reduction terminating timer is positive. The downshift flag SFTDWN is a flag which is set to 1 when the driving condition of the vehicle is a condition in which the downshift from the 4-speed gear to the 3-speed gear should be made by the transmission control unit 58. Such a determination is made by referring to the gear shift map as shown in FIG. 5. The downshift flag SFTDWN is returned to 0 when the gear shift to the 3-speed gear has terminated. Such a downshift flag SFTDWN is input from the transmission control unit 58 to the engine control unit 57 at any time. If the downshift flag SFTDWN is not equal to 1 (SFTDWN=0) and the torque reduction terminating timer CRE is equal to or below 0 (NO), since torque reduction is not necessary, the torque reduction terminating timer CRE, torque reduction inhibit timer CXE, torque reduction flag XETR and switching flag XY are set to 0 at a step #21a, and the ignition timing control for an ordinary period is performed at a step #20a. Then, return to a step #2a is performed.

On the other hand, if it is judged that the downshift flag SFTDWN is equal to 1 or the torque reduction terminating timer is above 0 (YES), at a step #4a, a decision is made as to whether or not the open degree of the throttle is smaller than the predetermined value TVO1 or a gear shift signal, other than for the downshift from the 4-speed gear to the 3-speed gear, is output from the transmission control unit 58. In this embodiment, during a low load state, in which TVO is smaller than the predetermined value TVO1 (i.e., during low load), the torque reduction is not performed during shifting. During such a low load, since the output torque of the engine is originally low, shocks from a push-up and from a gear shift are suppressed by only adjusting the oil pressure exerted on each of the friction locking elements of the transmission gear mechanism 3. By contrast, if torque reduction is performed, the torque of the engine is too low to secure the torque to produce an appropriate slip at the times of turning on, i.e., engagement and turning off, i.e., disengagement of the friction locking elements. Moreover, when a gear shift signal, other than that for the downshift from the 4-speed gear to the 3-speed gear, is output from the transmission control unit 58 to the engine control unit 57, rather than the control routine shown in this flowchart, another control routine for any other gear shift, not shown in the drawings, is executed. Therefore, it is not necessary to perform the torque reduction by this control routine.

At the step 4a, if either TVO is less than TVO1 or another gear shift signal is output (YES), at least in this control routine, since it is not necessary to perform the torque reduction, after steps #21a, #20a are executed, a return to the step #2a is performed, as is the case when NO is judged at the step #3a.

At the step #4a, if TVO is equal to or above 0 and it is judged that another gear shift signal is not output (NO), at the control routine of steps #5a to #9a, #22a and #23a, the torque reduction starting turbine speed TREV1 is operated, and a predetermined value $T_1$ is set to the torque reduction inhibit timer CXE only when TREV/NE is smaller than a predetermined value E1.

In this embodiment, if the ratio TREV/NE of the turbine speed TREV divided by the engine speed NE during an initial period of gear shift, namely, the speed ratio of the torque convertor 2 (hereinafter called torque convertor speed) is smaller than a predetermined value E1, as will be explained, since a torque ratio of the torque convertor 2 is large and the torque which is input to the transmission gear mechanism 3 is large, the torque reduction is started from the initial period of a gear shift so as to prevent shocks of the push-up and the gear shift effectively. However, a so called "pull-down" phenomenon, in which acceleration in a lengthwise direction of the vehicle body is quickly reduced because the transmission gear mechanism 3 temporarily enters an idling state right after starting of the downshift, may occur. Consequently, if the torque reduction is started right after starting of the downshift, such a pull-down is increasingly promoted. Therefore, after starting the downshift, the start of the torque reduction is delayed only for the predetermined time $T_1$.

During a downshift, such a driving condition (TREV/NE<E1) occurs, for example, when an acceleration pedal is slowly stepped on, so that the output torque of the engine, the engine speed, or the input torque to the transmission gear mechanism 3 is increased compliantly against the variation of the open degree of the throttle or the variation of the load of the engine. As shown in FIG. 5, since a gear shift map is generally made on the basis of the opening degree of the throttle and the vehicle speed, such a downshift is performed on the basis of the opening degree of the throttle and the vehicle speed. However, even if the opening degrees of the throttle are equal each other, when the acceleration pedal is slowly stepped on, the output torque of the engine, or the engine speed, is increased in compliance with the variation of the opening degree of the throttle. Therefore, the torque input to the transmission gear mechanism 3 through the torque convertor 2 becomes large. On the other hand, when the acceleration pedal is quickly stepped on, the output torque of the engine, or the engine speed, is lowered, but not in compliance with the variation of the open degree of the throttle. Therefore, the torque input to the transmission gear mechanism 3 through the torque convertor 2 becomes small. Accordingly, a chasing state of the input torque to the transmission gear mechanism 3, against the variation of the open degree of the throttle, or variation of the engine load, is grasped by or reflected in the torque convertor speed ratio. Thereby, the input torque to the transmission gear mechanism 3 is grasped, so that in response to this, the gear shift characteristic is improved by changing the timing during which the torque reduction is performed.

Figure 23:
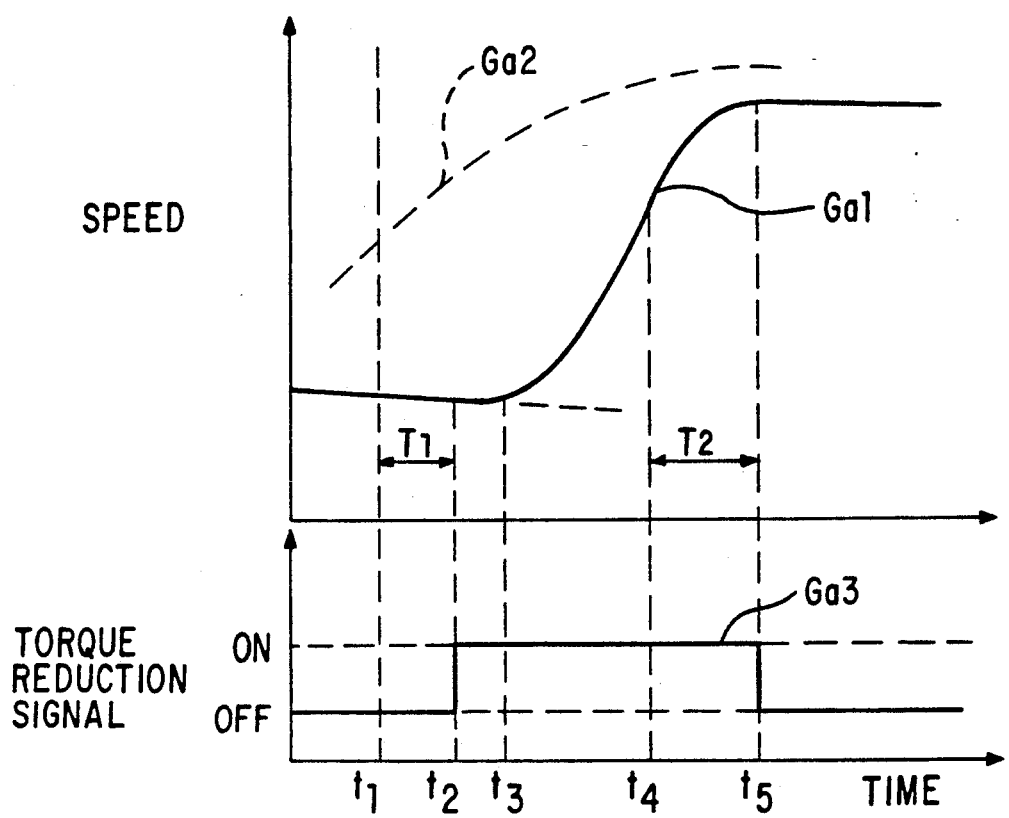
FIGS. 23 and 24 are charts showing relationships between revolution speeds of a turbine and an engine and a torque reduction signal against time, during downshifting.

In FIG. 23, the characters of the turbine speed (curved line $Ga_1$), engine speed (curved line $Ga_2$), and the torque reduction signal (folded line $Ga_3$), against time, during downshifting, when the torque convertor speed ratio is low as mentioned above, are shown. Moreover, FIG. 24 is referred to in the following.

If the torque convertor speed ratio TREV/NE, during an initial period of the downshift, is equal to or larger than the predetermined value E1, since the torque ratio of the torque convertor 2 is relatively small, the torque input to the transmission gear mechanism 3 is relatively small, and the push-up is not so strong. Therefore, during a middle period of the gear shift, the torque reduction is started from a timing such that the turbine speed TREV is increased to the torque reduction starting turbine speed TREV1, which will be explained later. Moreover, such a driving condition occurs, for example, when the acceleration pedal is quickly stepped on and the torque input to the transmission gear mechanism 3 is not chased so much against the variation of the open degree of the throttle.

Figure 24:
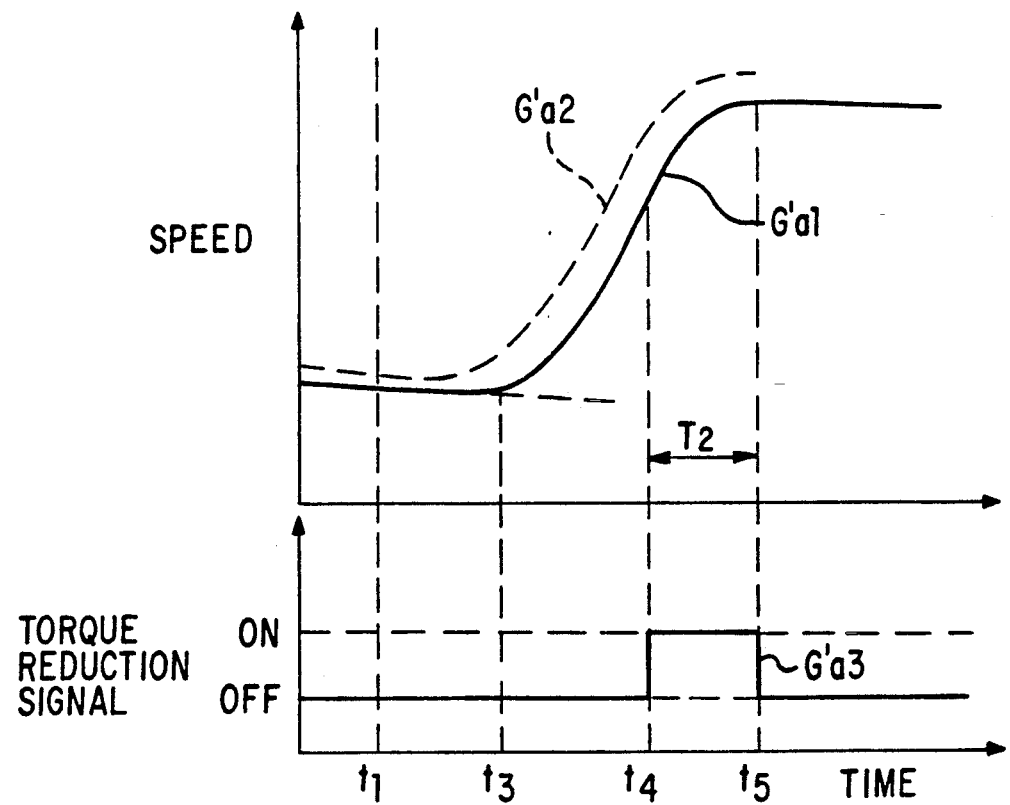

In FIG. 24, the characteristics of the turbine speed (curved line $Ga_{1'}$), engine speed (curved line $Ga_{2'}$), and the torque reduction signal (folded line $Ga_{3'}$), against time, during downshifting, when the torque convertor speed ratio is high as mentioned above, are shown. Moreover, FIG. 24 is referred in the following.

The torque reduction starting turbine speed XTREV1 is basically a turbine speed at which the torque reduction should be started when the turbine speed TREV is increased to XTREV1 during a downshift when the torque convertor speed ratio is large. At a step #9a, the torque reduction starting turbine speed XTREV1 is operated from Formulas 1a and 2a which follow. Moreover, when the torque converter speed ratio is small, the torque reduction starting turbine speed XTREV1 is not a factor for determining the starting timing of the torque reduction but simply a standard which starts the torque reduction terminating timer CRE.

$XTREV1 = TREV_0 + OTR*(TREVn - TREV_0)$ is Formula 1a; and $TREVn = TREV_0*GR3/GR4$ is Formula 2a.

$TREV_0$ is a turbine speed at the start of a gear shift;
OTR is a constant, smaller than 1, set according to the kind of gear shift;
TREVn is a predicted turbine speed after a downshift;
GR3 is gear ratio before the gear shift (in, e.g., the 3-speed gear); and
GR4 is gear ratio after the gear shift (in, e.g., the 4-speed gear).

Moreover, $TREV_0$ is basically a turbine speed TREV when the step #23a (executed one time by one downshift) is executed, and is a turbine speed at a timing at which the turbine speed starts to increase during a downshift.

In the control routine of steps #5a to #9a, #22a, and #23a, at the step #5a, decisions as to whether or not the downshift flag SFTDWN(i−1) of the latest time is equal to 0 and the downshift flag SFTDWN(i) of the present time is equal to 1, namely, whether or not it is the first time after starting the downshift, are made. If it is the first time (YES), at a step #6a, a decision as to whether or not the vehicle speed VSP is smaller than the predetermined value VSP1 and the torque convertor speed ratio TREV/NE during an initial period of the downshift is smaller than the predetermined value E1 is made.

Here, if the vehicle speed VSP<VSP1 and the torque convertor speed ratio TREV/NE<E1 (YES), since the torque reduction, when the torque convertor speed ratio is small, namely, the torque reduction control such that the torque reduction starts from the initial period of the downshift is performed, at the step #7a, a predetermined time $T_1$ is provided to the torque reduction inhibit timer CXE. The reason why the torque reduction control is limited during low speed driving when VSP<VSP1 such as here is that, since the momentum of the vehicle body is large at high speed driving, even if the torque is abruptly transmitted to a side of the transmission gear mechanism 3 from a side of the engine 1, the vehicle speed is not changed much, so that the shocks from the gear shift tend not to be produced.

On the other hand, if it is judged that the vehicle speed VSP is equal to or above VSP1 or the torque convertor speed ratio TREV/NE is equal to or above E1 (NO), since the torque reduction when the torque convertor speed ratio is large, namely, the torque reduction control in which the torque reduction starts from the middle period of the downshift is performed, the step #7a is skipped.

At the step #8a, the turbine speed TREV(i) at the present time is memorized as a temporary turbine speed $TREV_0$ at a timing of starting gear shift. This $TREV_0$ is a temporary value, and is for a back-up when the step #23a, which will be mentioned later, fails.

During the downshift, on and after the second time, the step #22a is executed after the step #5a. Then, at the step #22a, if it is judged that the variation ratio of the turbine speed VTREV(i−1) of the latest time is minus or negative and the variation ratio of the turbine speed VTREV(i) of the present time is larger than the predetermined value VTREV1 (value equal to or larger than 0) and the answer to the decision made in step #22a is (YES), namely, if the turbine speed starts to increase substantially (timing $t_3$ in FIGS. 23 and 24), the step #23a is executed only one time, and the turbine speed TREV(i) is memorized as a true turbine speed $TREV_0$ at the start of a gear shift. On the basis of the true turbine speed $TREV_0$, the torque reduction starting turbine speed XTREV1 is operated using Formulas 1a and 2a at the step #9a.

At a step #10, a decision as to whether or not the torque reduction inhibit timer CXE(i) is larger than 0 is made. Here, if the torque reduction inhibit timer CXE(i) is larger than 0 (YES), the torque reduction control when the torque convertor speed ratio is small (TREV/NE<E1) is performed.

Hereinafter, the torque reduction control when the torque convertor speed ratio is small (TREV/NE<E1) is explained.

In this case, CXE(i) is decreased every time by 1 at step #11a, if it is judged that the torque reduction inhibit timer CXE(i−1) at the latest time is positive and the torque reduction inhibit timer CXE(i) at the present time is 0 (YES). When the period $T_1$ has passed since the torque reduction has started, the torque reduction flag XETR takes a value of 1 at a step #13a, and torque reduction starts.

Thus, as shown in FIG. 19, the torque reduction has started since timing $t_2$ after $T_1$ after starting the downshift. However, now, since CXE becomes 0, NO is inevitably judged at the step #10a on and after the next time, so that the steps #24a to #26a are executed (part of this program may be skipped under other conditions). In this case, if TREV>XTREV1 is judged (YES) at the step #25a, the step #26a is executed only one time, and a predetermined value $T_2$ is provided to the torque reduction terminating timer CRE. The switching flag XY is set to 1. The switching flag XY is a flag for skipping steps #25a, #26a for the next time when the step #26a is executed one time.

Here, the torque reduction terminating timer CRE is used for terminating the torque reduction at a timing after passing time $T_2$ from the time at which TREV becomes larger than XTREV1.

Steps #14a to #17a form a control routine by which the torque reduction flag XETR is returned to 0 at a timing after a time $T_2$ from the time (timing $t_4$ in FIG. 23) at which TREV becomes larger than XTREV1.

More specifically, if it is judged that the torque reduction terminating timer CRE(i) is to be positive and the answer to the decision made in step #14a is (YES), the torque reduction terminating timer CRE(i) is decreased every time by 1 at the step #15a. If the torque reduction terminating timer CRE(i) reaches 0 (YES), the torque reduction flag XETR is returned to 0 at the step #17a. Moreover, if the torque reduction terminating timer CRE(i) is judged to be equal to or below 0 (NO) at the step #14a, the steps #15a to #17a are skipped.

At the step #18a, a decision as to whether or not the torque reduction flag XETR is equal to 1 is made. If XETR is equal to 0, a signal for the torque reduction is output at the step #19a, and, after performing the torque reduction by retarding of the ignition timing, an ordinary gear shift control is performed at the step #20a. Then, a return to the step #2a is performed. On the other hand, if XETR=0 (NO), by skipping the step #19a, namely, without performing torque reduction, only an ordinary gear shift control is performed at the step #20a. Then, a return to the step #2a is performed.

In this case, or if TREV/NE<E1 or the torque input to the gear shift mechanism 3 is relatively large, as shown in FIG. 23, after starting the downshift at the timing $t_1$, the torque reduction starts at the timing $t_2$ (an initial period of the downshift) after time $T_1$. Then the torque reduction terminates at the timing $t_5$ after a time $T_2$ from the timing $t_4$ at which TREV becomes smaller than E1 with an increase in the turbine speed.

Thus, when the torque input to the transmission gear mechanism is large and TREV/NE<E1, where the push-up phenomenon is strong, since the starting timing of the torque reduction is set during the initial period of the downshift, a strong torque reduction is performed, and the push-up is effectively suppressed. Consequently, the occurrence of the shocks due to the gear shift is prevented.

Moreover, it is possible that the torque reduction will start at the same time as the downshift (namely, $T_1$ is set to 0).

In addition, although, in this apparatus, the torque reduction is terminated at the timing $t_5$ all at once, it is possible to gradually terminate the torque reduction by changing the amount at which the ignition timing is retarded gradually or step by step.

Hereinafter, the torque reduction control when torque convertor speed ratio is large (TREV/NE is equal to or above E1), namely, when the torque input to the transmission mechanism is small, is explained.

In this case, as mentioned above, the step #7a is not executed, and since CXE is always equal to 0, NO is inevitably judged at the step #10a. Therefore, the steps #24a to #26a are executed (a part of this program may be skipped under other conditions). However, at this timing, since the torque reduction flag XETR becomes 0, the answer to the decision as to whether or not TREV>XTREV1 is determined to be (YES) at the step #25a. After the step #26a, the predetermined value $T_2$ is set to the torque reduction terminating timer CRE only when the step #13a is executed. Finally the torque reduction flag XETR is set to 1. Namely, the torque reduction starts from the time (timing $t_4$ in FIG. 24) at which TREV becomes larger than XTREV1. Moreover, torque reduction is terminated at the timing $T_2$ after the time at which TREV becomes larger than XTREV1.

That is, in this case, or when TREV/NE is equal to or larger than E1, or when the torque input to the gear shift mechanism 3 is relatively small, as shown in FIG. 24, after starting the downshift at the timing $t_1$, the torque reduction starts at the timing $t_4$ (a middle period of the downshift) at which TREV becomes larger than XTREV1 with an increase in the turbine speed. Then, the torque reduction terminates at the timing $t_5$ after time $T_2$ from the timing $t_4$.

Thus, when the torque input to the transmission gear mechanism is small, and TREV/NE is equal to or larger than E1, where the push-up phenomenon is not so strong, since the starting timing of the torque reduction is set during the middle period of the downshift, a proper torque reduction is performed according to the input torque to the transmission gear mechanism 3, and push-up is effectively suppressed. The occurrence of the shocks of the gear shift is, therefore, prevented.

To sum up, in this control apparatus, by the torque convertor speed ratio TREV/NE, the variation of the opening degree of the throttle, or the chasing state of the input torque to the transmission gear mechanism 3 against the variation of the load of the engine, is grasped. On the basis of such a chasing state, the starting timing of the torque reduction is changed, so that the proper torque reduction according to the torque input to the transmission gear mechanism is performed.

Moreover, in this control apparatus, although the chasing state of the transmission gear mechanism 3 against the variation of the load of the engine, or of the open degree of the throttle, is grasped by the torque convertor speed ratio TREV/NE, it is possible to grasp the variation ratio (or differential ratio) dTVO/dt of the open degree of the throttle with respect to time. In this case, at step #6a, a decision as to whether or not dTVO/dt is smaller than a predetermined value N is made, and if dTVO/dt is smaller than N, since the output of the engine chases the variation of the open degree of the throttle, the step #7a is executed. Otherwise, if dTVO/dt is equal to or larger than N, since the output of the engine dose not chase, the step #7a is skipped.

Referring to FIGS. 25 to 29, another torque reduction control will be explained using a upshift from the 2-speed gear to the 3-speed gear. Moreover, since such a torque reduction control is performed during all kinds of gear shift, control routines for the torque reduction control are individually provided for every upshift and downshift, but they are not shown.

Figure 25:
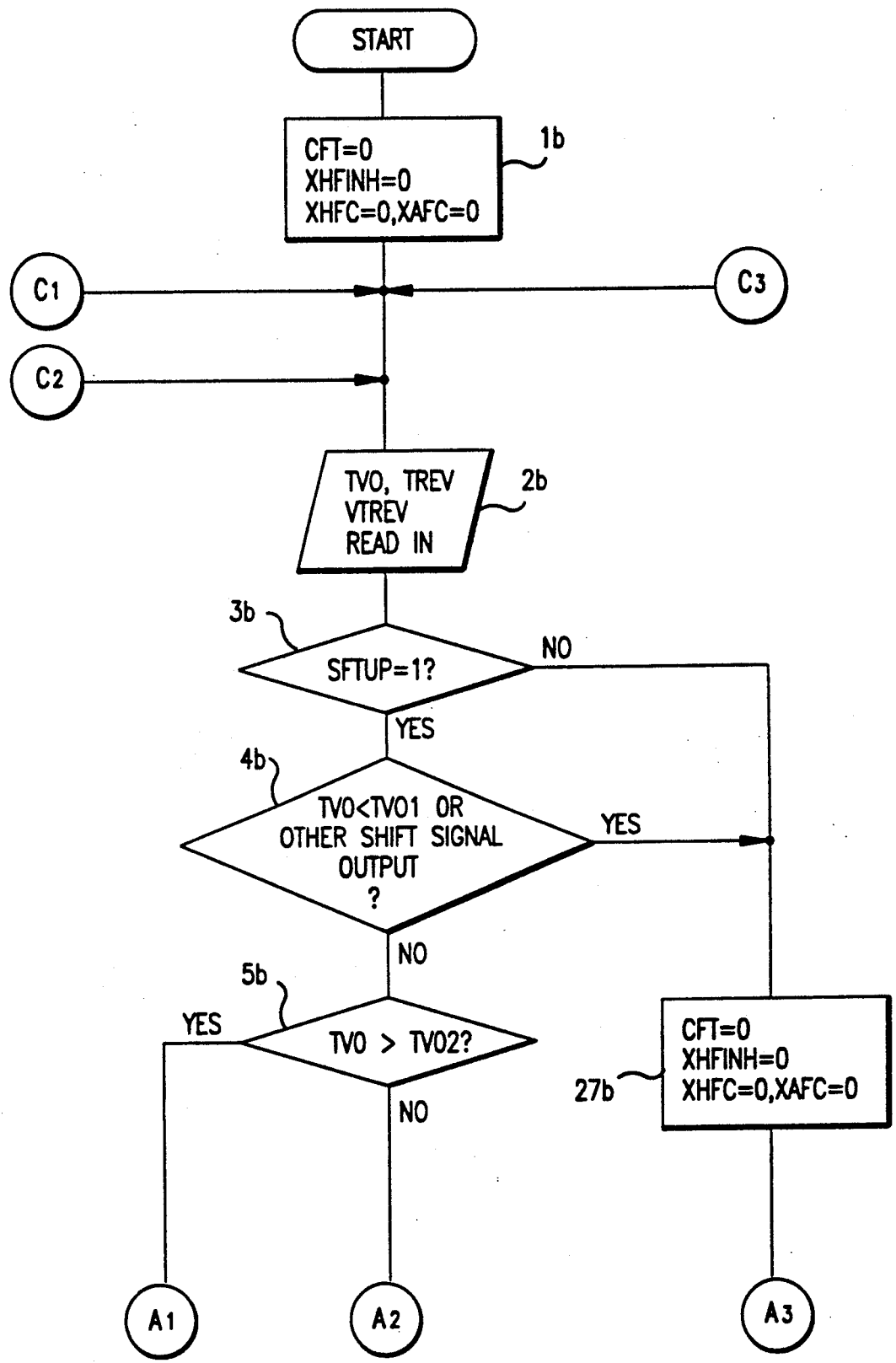
FIGS. 25 to 28 are flowcharts showing another fuel cut control in which a previous light reduction is performed in accordance with a preferred embodiment of the present invention.
Figure 26:
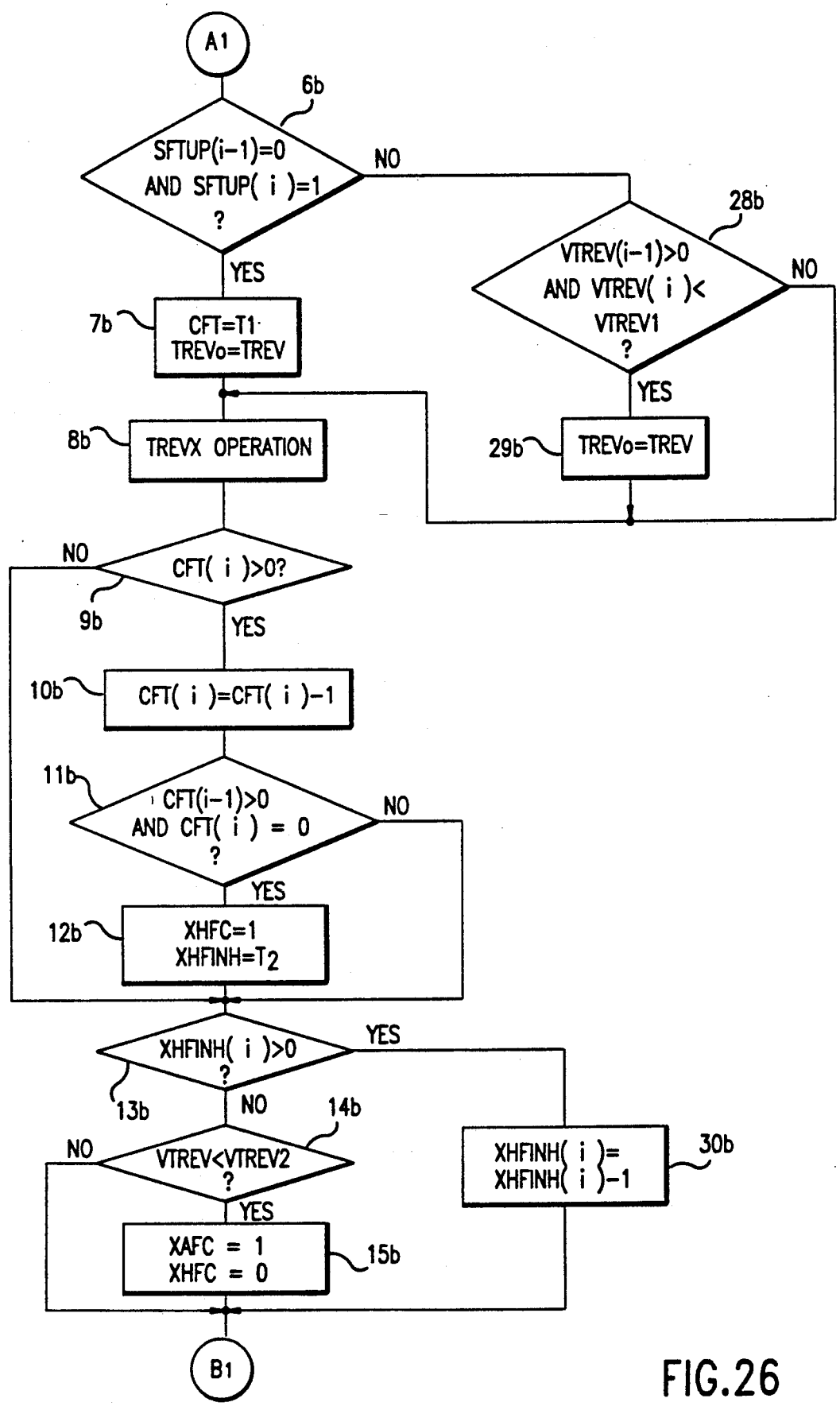
Figure 27:
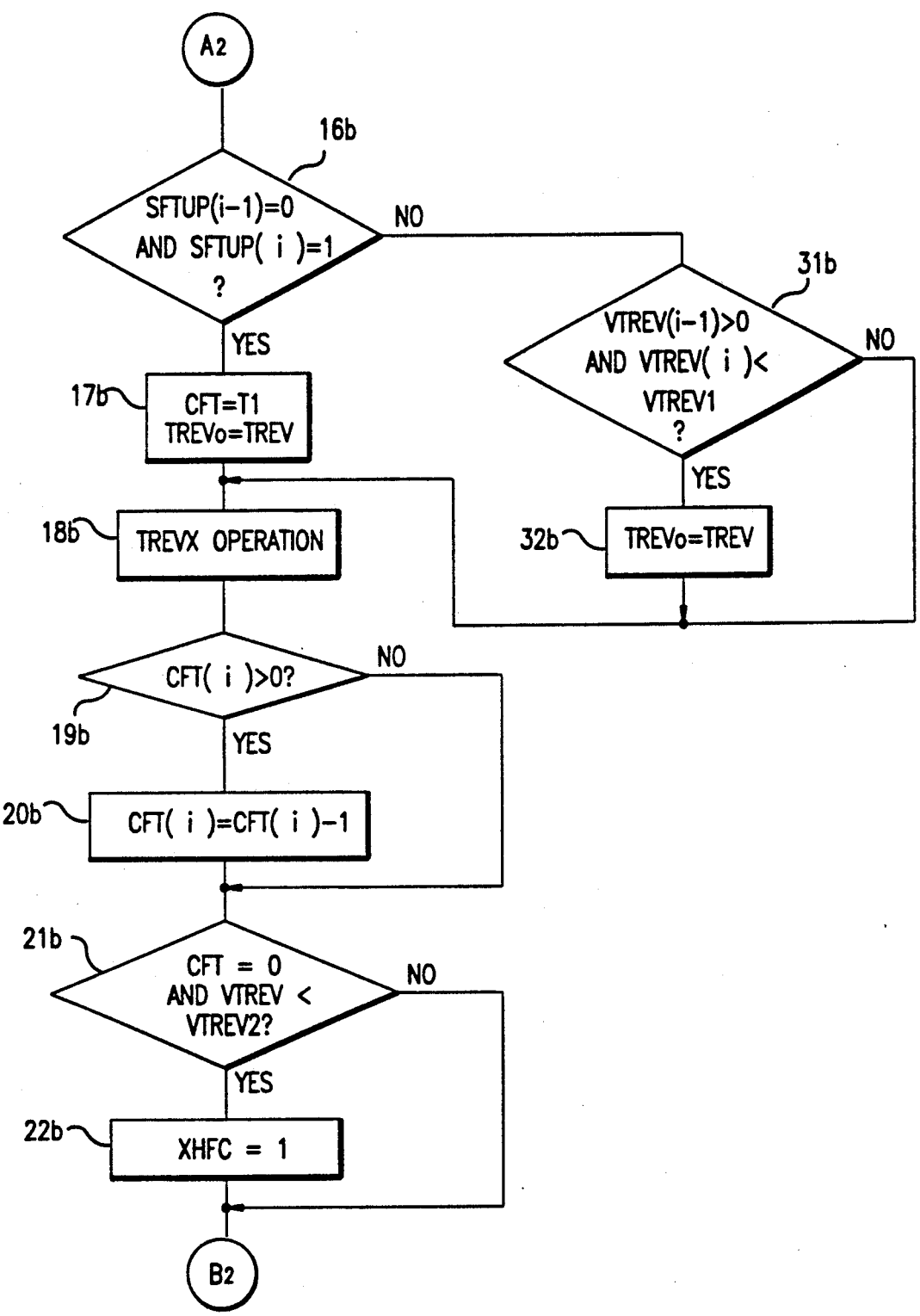
Figure 28:
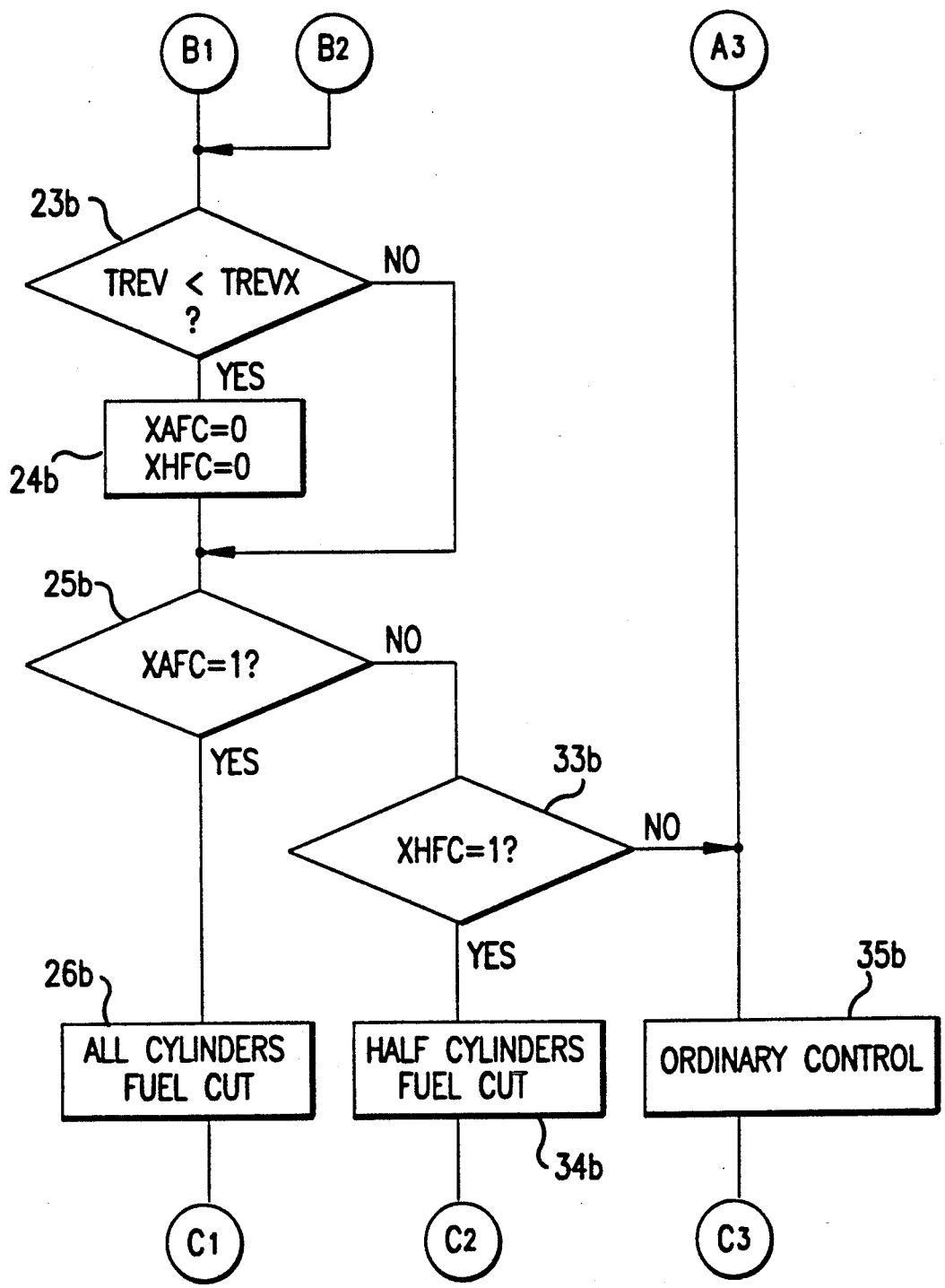

The meaning of each sign used in flowcharts of FIGS. 25 and 28 is described in the following.

(1) TVO: opening degree of the throttle detected by the throttle open degree sensor 65;
(2) TREV: turbine speed detected by the turbine speed sensor 67;
(3) VTREV: variation ratio of the turbine speed obtained by a differential of the turbine speed TREV with respect to time;
(4) CFT: fuel cut inhibit timer to delay a start of the fuel cut only for a predetermined time during upshift;
(5) XHFINH: fuel cut timing judgement inhibit timer to delay a start of judgement of variation of turbine speed induced by the upshift only for predetermined time, when a fuel cut for half of the cylinders is started;
(6) XHFC: half cylinders fuel cut flag for stopping fuel supply to half of the cylinders when its value is 1;
(7) XAFC: all cylinders fuel cut flag for stopping fuel supply to all of the cylinders when its value is 1;
(8) SFTUP: upshift flag, which is set to 1 when the driving condition becomes a condition such that an upshift from the 2-speed gear to the 3-speed gear should be performed;
(9) TREVn: predicted turbine speed after upshift; and
(10) TREVn: fuel cut terminating turbine speed.

If the control starts, firstly, the fuel cut inhibit timer CFT, the fuel cut timing judgement inhibit timer XHFINH, the half cylinders fuel cut flag XHFC and the all cylinders fuel cut flag XAFC are initialized at a step #1b (all are set to 0).

At a step #2b, the opening degree of the throttle TVO, the turbine speed TREV, and the variation ratio of the turbine speed VTREV are read in.

At a step #3a, a decision as to whether or not the upshift flag SFTUP is set to 1 is made. The upshift flag SFTUP is a flag which is set to 1 when the driving condition of the vehicle becomes a condition such that the upshift from the 2-speed gear to the 3-speed gear should be made by the transmission control unit 58, referring to the gear shift map as shown in FIG. 5, and which is returned to 0 when the upshift to the 3-speed gear is terminated. Such an upshift flag SFTUP is input from the transmission control unit 58 to the engine control unit 57 at any time. Here, if the upshift flag SFTUP is not set to 1 (NO), since the torque reduction is not necessary, the fuel cut timing judgement inhibit timer XHFINH, the half cylinders fuel cut flag XHFC and the all cylinders fuel cut flag XAFC are set to 0 at a step #27b, and the ignition timing control for an ordinary period is performed at a step #35b. Then, a return to a step #2b is performed.

On the other hand, if the upshift flag SFTUP is judged to be set to 1 (YES), at a step #4b, a decision as to whether or not the open degree of the throttle is less than the predetermined value TVO1 or a gear shift signal except this upshift (from the 2-speed gear to the 3-speed gear) is output from the transmission control unit 58 is made. In this embodiment, during a low load state in which TVO is less than the predetermined value TVO1, torque reduction is not performed during shifting. During such a low load, the output torque of the engine is originally low. Consequently, the shocks of the push-up and gear shift are suppressed by only adjusting the oil pressure exerted on each of the friction locking elements of the transmission gear mechanism 3. By contrast, if torque reduction is performed, the torque of the engine is too low to secure the torque to produce an appropriate slip at the time of turning on and turning off of the friction locking elements. Moreover, when a gear shift signal, other than the upshift from the 2-speed gear to the 3-speed gear, is output from the transmission control unit 58 to the engine control unit 57, since rather than the control routine shown in this flowchart, another control routine for during other gear shift, not shown in the drawings, is executed, it is not necessary to perform the torque reduction by this control routine.

At the step 4b, if either TVO is smaller than TVO1 or another gear shift signal is output (YES), at least in this control rountine, since it is not necessary to perform the torque reduction, after steps #27b, #35b are executed, returning to the step #2b is performed, as when NO is judged at the step #3b.

If is judged that the opening degree of the throttle TVO is equal to or larger than TVO1 and another gear shift signal is not output (NO), then, at the step #4b, a decision as to whether or not the opening degree of the throttle TVO is larger than a predetermined value TVO2, which is set larger than the value TVO1 mentioned above is made. In this embodiment, since, during a high load condition, in which the opening degree of the throttle exceeds the predetermined value TVO2 (i.e., during high load), the torque of the engine is very large. Thus, in order to suppress the push-up effectively, the torque reduction is performed by stopping the fuel supply to all cylinders (all cylinder fuel cut) from the time at which the turbine speed TREV begins to shift substantially as a result of the upshift action. Prior to this, at a predetermined timing, a light preceding torque reduction is performed by stopping fuel supply to a half of four cylinders, or two cylinders (half cylinder fuel cut). On the other hand, during a medium level load condition, in which the opening degree of the throttle TVO is equal to or below TVO2 (i.e., during a middle load), since the torque of the engine is not so large, if a torque reduction such as a torque reduction which is done during high load is performed, a proper slip may not be obtained for the friction locking elements, due to shortage of torque from the engine. Therefore, only the half cylinders fuel cut is performed from the time at which the turbine speed TREV begins to shift as induced by the upshift action, and the all cylinders fuel cut is not performed.

At a step #5b, if it is judged that the opening degree of the throttle valve TVO is larger than TVO2 (YES), the torque reduction during high load is performed.

Figure 29:
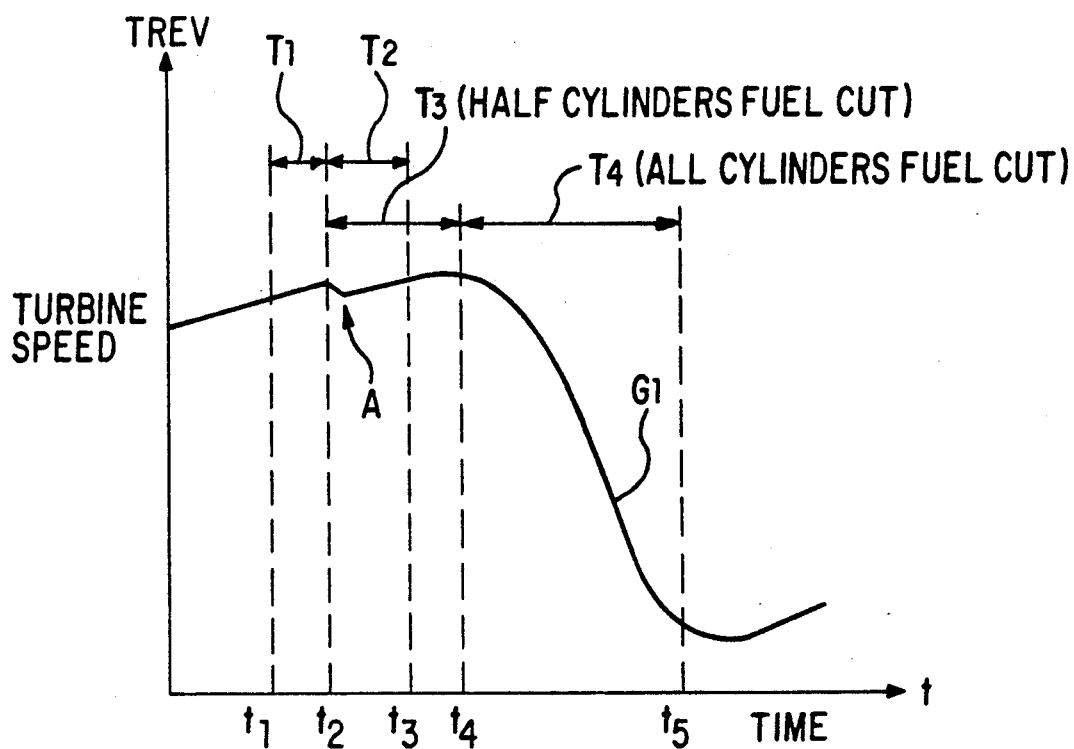
FIGS. 29 and 30 are charts showing characteristics of revolution speed of a turbine against time.

In FIG. 29, a characteristic of the variation of the turbine speed TREV with respect to time, when such a torque reduction control for high load is started at the timing $t_1$, is shown (curved line $G_1$). Hereinafter, referring to FIG. 9, the control method for high load is explained.

In a serial control routine including steps #6b to #8b, #28b and #29b, a predetermined value $T_1$ is set to the fuel cut inhibit timer CFT at the starting timing of the upshift, and a fuel cut terminating turbine speed TREVX is operated at a predetermined timing.

The fuel cut inhibit timer CFT is a timer for inhibiting a start of the half cylinders fuel cut only during the predetermined value $T_1$ after starting upshift. Namely, since, if the half cylinders fuel cut is started simultaneously with the start of the upshift, the pull-down phenomenon may deteriorate, the start of the half cylinder fuel cut is delayed for only the predetermined value $T_1$.

Moreover, the fuel cut terminating turbine speed TREVX is a turbine speed at which the fuel cut (the torque reduction) should be terminated, when the turbine speed TREV is lowered to the fuel cut terminating turbine speed TREVX, during the upshift, and is determined by the following Formulas 1b, 2b at a step #8b.
$TREVX = TREV_0 + OTR*(TREVn - TREV_0)$ is Formula 1b; and
$TREVn = TREV_0*GR3/GR2$ is Formula 2b.
$TREV_0$ is a turbine speed at a start of a gear shift;
OTR is a constant, less than 1, set according to the kind of the gear shift;
TREVn is a predicted turbine speed after a downshift;
GR3 is a gear ratio before the gear shift (the 3-speed gear); and
GR2 is a gear ratio after the gear shift (the 2-speed gear).

Moreover, $TREV_0$ is basically a turbine speed TREV when the step #29b (executed one time by one downshift) is executed, and is a turbine speed at a timing at which the turbine speed starts to decrease by action of the upshift.

In these serial steps, at the step #6b, a decision as to whether or not the downshift flag SFTUP(i−1) of the latest time is equal to 0 and the downshift flag SFTUP(i) of the present time is equal to 1, namely, whether it is the first time after starting the upshift or not, is made. If it is the first time (YES), at a step #7b, the predetermined value $T_1$ is set to the fuel cut inhibit timer CFT mentioned above, and the turbine speed TREV at this timing is memorized as a temporary turbine speed $TREV_0$ at the time gear shifting starts. This turbine speed $TREV_0$ is a temporary value, and is for back-up when the step #29b mentioned above fails. During the second and subsequent upshifts, the step #28b is executed after the step #6b. Then, at the step #28b, if the variation ratio of the turbine speed VTREV(i−1) of the latest time is positive and the variation ratio of the turbine speed VTREV(i) of the present time is judged to be smaller than the predetermined value VTREV1 (equal to or smaller than 0) (YES), namely, if the turbine speed does not tend to increase, the step #29b is executed only one time, and the turbine speed TREV(i) is memorized as a true turbine speed $TREV_0$ at the start of a gear shift. On the basis of the turbine speed $TREV_0$, the fuel cut terminating turbine speed XREVX is determined at the step #8b.

Steps #9b to #12b form a control routine in which, after starting the upshift, by waiting until the fuel cut inhibit timer CFT becomes 0, or until the predetermined time $T_1$ has passed, the half cylinders fuel cut flag is set to 1 when the time $T_1$ has passed. Also, a predetermined value $T_2$ is set to the fuel cut timing judgement inhibit timer XHFINH.

If the predetermined time $T_1$ has passed after starting the upshift, as shown in FIG. 29, the half cylinders fuel cut starts at the timing $t_2$. According to this, the torque of the engine is lowered a little. Thus, a falling down of the turbine speed TREV occurs as shown by a arrow A. On the other hand, as will be explained later, whether or not the turbine speed TREV starts to decrease is judged at a step #14b, the all cylinders fuel cut is performed. If the judgement of the step #14b is performed in this state, due to the falling down (shown as A in FIG. 29) of the turbine speed, an erroneous judgement that the turbine speed begins to decrease is made, and a disadvantage in that the all cylinders fuel cut is started occurs. To avoid such a disadvantage, as shown in FIG. 29, after starting the half cylinders fuel cut, the judgement is not executed at the step #14 only during the predetermined time $T_2$, which is sufficient for recovery from the induced falling down of the turbine speed TREV. The judgement is performed from the timing $T_3$.

More specifically, at the step #9b, if it is judged that the fuel cut inhibit timer (i) is equal to or smaller than 0, the steps #10 to #12 are skipped. On the other hand, if it is judged that the fuel cut inhibit timer (i) is larger than 0 (YES), while the fuel cut inhibit timer (i) is decreased one by one, if it is judged that the fuel cut inhibit timer (i) has reached 0 (YES) at the step #11b, the half cylinders fuel cut flag XHFC is set to 1 at the step #12b, and the predetermined value $T_2$ is set to the fuel cut timing judgement inhibit timer XHFINH.

Steps #13b to #15b and #30b form a control routine in which, after starting the half cylinders fuel cut, the judgement as to whether the turbine speed TREV starts to decrease or not at the step #14b is inhibited until the fuel cut timing judgement inhibit timer XHFINH(i) becomes 0 by being decreased by decrements of one at the step #30b, or until the predetermined time $T_2$ is passed. The all cylinders fuel cut is started when the turbine speed TREV begins to decrease after the time $T_2$ has passed.

At a step #14b, if it is judged that the variation ratio of the turbine speed VTREV is smaller than the set value VTREV2 (value equal to or smaller than 0) (YES), at the step #15b, the all cylinders cut fuel flag XAFC is set to 1, and the half cylinders fuel cut flag XHFC is returned to 0. In FIG. 9, the all cylinders fuel cut starts at the timing $t_4$.

Steps #23b to #26b and #33b to #35b form a control routine in which, in response to states of the half cylinders fuel cut flag XHFC and the all cylinders cut fuel flag XAFC, one of the half cylinders fuel cut, the all cylinders fuel cut, and the fuel injection control for ordinary time is performed. Also, the fuel cut is terminated when the turbine speed is lower than the fuel cut terminating turbine speed TREVX while either the half cylinders fuel cut or the all cylinders fuel cut is performed.

More specifically, at the step #23b, it is determined whether or not the turbine speed TREV is smaller than the fuel cut terminating turbine speed TREVX. If the turbine speed TREV is equal to or larger than the fuel cut terminating turbine speed TREVX, and the answer to the decision made in step #23b is (NO), torque reduction by the all cylinders fuel cut is performed at the step #26b when the all cylinders fuel cut flag XAFC is equal to 1. The light torque reduction by the half cylinders fuel cut is performed at the step #34b when the half cylinders fuel cut flag XHFC is equal to 1. Also, the fuel injection control for an ordinary time in which the torque reduction is not performed is made at the step #35b when the all and half cylinders fuel cut flags XAFC and XHFC both are equal to 0.

During high load, as shown in FIG. 29, after the upshift is started at the timing $t_1$, the half cylinders fuel cut or light preceding torque reduction is started at the timing $t_2$, the all cylinders fuel cut or torque reduction is started at the timing $t_4$, and the all cylinders fuel cut or torque reduction is terminated at the timing $t_5$.

Prior to the time the turbine speed begins to be lowered, the light preceding torque reduction is performed by the half cylinders fuel cut, and torque reduction is performed by the all cylinders fuel cut at the timing at which the turbine speed begins to be lowered or locking of a predetermined friction locking elements (coast clutch 43, 3-4 clutch 44) of the transmission gear mechanism 3 tends to start. Thus, the push-up phenomenon is effectively suppressed by the torque reduction, and the occurrence of shocks from the push-up and the gear shift are prevented. Moreover, although the half cylinders fuel cut starts an early period after starting the upshift, a deterioration of the pull-down phenomenon is not brought about, because decreasing of the torque of the engine by the half cylinders fuel cut is not very large.

Meanwhile, at the step #5b mentioned above, if it is judged that the opening degree of the throttle TVO is equal to or smaller than TVO2, the torque reduction during middle load is performed.

Figure 30:
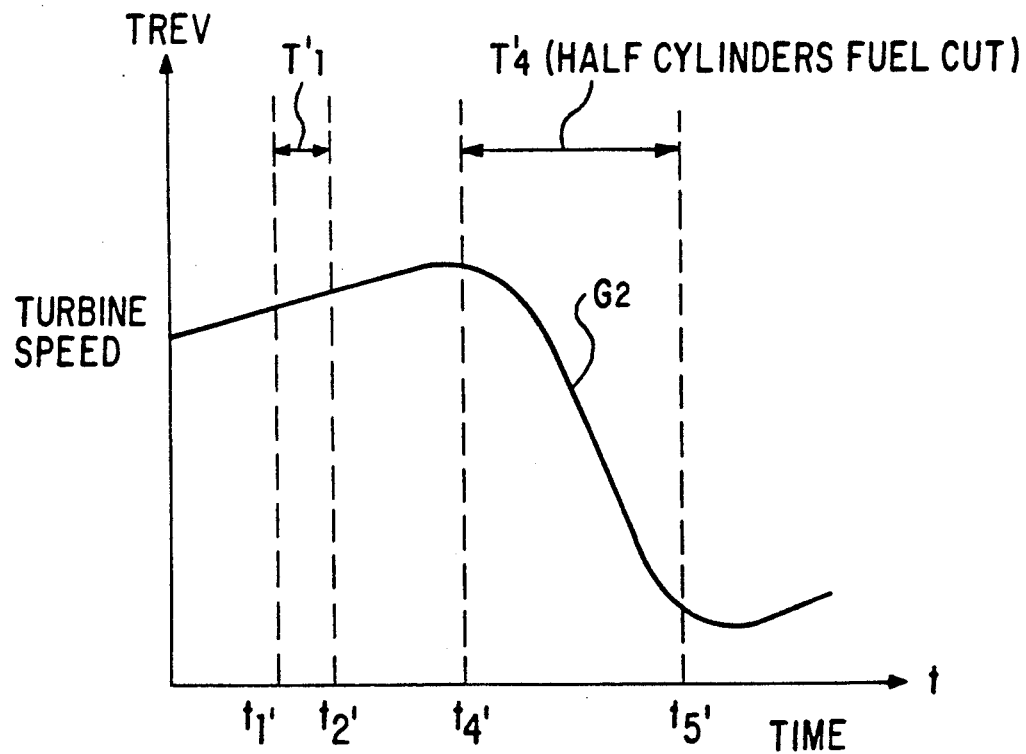

In FIG. 30, a the variation of the turbine speed TREV with respect to time, when a torque reduction control for a middle load is started at the timing $t_{1'}$, is shown (curved line $G_2$). Hereinafter, referring to FIG. 30, the control method for a middle load is explained.

In a serial control routine including steps #16b to #18b, #31b and #32b, a process similar to steps #6b to #8b, #28b and #29b forming the control routine during a high load mentioned above is performed. A predetermined value $T_1$ is set to the fuel cut inhibit timer CFT, and a fuel cut terminating turbine speed TREVX is provided. In this case, as in the control routine for high load, to prevent the deterioration of the pull-down, the fuel cut inhibit timer CFT inhibits the start of the half cylinders fuel cut only by the predetermined $T_1$ after starting the upshift. Moreover, in this case, the fuel cut terminating turbine speed TREVX is a turbine speed at which the half cylinders fuel cut should be terminated.

At steps #19b and #20b, decrements of one are repeatedly preformed until the fuel cut inhibit timer CFT becomes 0. Moreover, if the fuel cut inhibit timer CFT becomes 0, these steps do substantially nothing.

At a step #21, it is determined whether or not the fuel cut inhibit timer CFT is equal to 0 and the variation ratio of the turbine speed VTREV is smaller than the predetermined value VTREV2, as was the case in step #14b. If the fuel cut inhibit timer CFT is equal to 0 and the variation ratio of the turbine speed VTREV is smaller than the predetermined value VTREV2 (YES), the half cylinders fuel cut flag is set to 1 at the step #22b.

During a middle load as well as during high load, at the steps #23b to #26b and #33b to #35b, in response to the states of the half and all cylinders fuel cut flags XHFC and XAFC, the fuel cut and the ordinary control are performed and the fuel cut is terminated at the predetermined timing. It is also possible to not perform the all cylinders fuel cut.

During a middle load, as shown in FIG. 30, after starting the upshift at the timing $t_{1'}$, the light torque reduction by the half cylinders fuel cut starts at the timing $t_{4'}$. The half cylinders fuel cut is terminated at the timing $t_{5'}$.

Thus, since the relatively light torque reduction is performed by the half cylinders fuel cut from the timing at which the turbine speed begins to be lowered during a middle load, at which the torque of the engine is relatively small, shortage of torque from the engine does not occur. Therefore, a proper slip is produced between the predetermined friction locking elements of the transmission gear mechanism 3, and consequently, good transmission characteristics are obtained.

Moreover, although it is not shown in the flowchart of FIGS. 25 to 28, it is possible that during high and middle loads, only a light torque reduction by a half cylinders fuel cut can be performed continually from a stage prior to the time at which the turbine speed starts to be lowered, induced by the upshift, until the timing at which the upshift is substantially terminated.

Moreover, it is possible to perform either or both the preceding torque reduction and the torque reduction not by the fuel cut, as in this embodiment, but by changing the size of the retard angle or delay of the ignition timing of the ignition plug 9.

Finally, it is to be understood that although the present invention has been described in detail with respect to preferred embodiments thereof, various other embodiments and variations may occur to those skilled in the art. It is intended that such other embodiments and variations be covered by the following claims.

What is claimed is:

1. A control apparatus for controlling an engine and an automatic transmission for an automotive vehicle so that output torque of said engine is reduced in a torque reduction period during gear shifting, said control apparatus comprising:

shift control means for shifting said automatic transmission in response to a load of said engine;

torque reduction timing means for changing a time from which said torque reduction period starts in response to compliance of variations in an input torque of said automatic transmission with variations in said load of said engine; and reduction control means for controlling said output torque of said engine so that said output torque is reduced during said torque reduction period after said time is changed by said torque reduction timing means.

2. A control apparatus according to claim 1, wherein said torque reduction timing means samples said compliance on the basis of input and output characteristics of a torque converter in an initial period of gear shifting.

3. A control apparatus according to claim 1, wherein said torque reduction timing means samples said compliance on the basis of characteristics of said variation.

4. A control apparatus as defined in claim 1, wherein said torque reduction timing means retards said time when a deviation in time of a change in said input torque relative to a change in said output torque is small.

5. A control apparatus as defined in claim 1, and further comprising valve opening detecting means for detecting an opening of a throttle valve as said load of said engine.

* * * * *